(12) United States Patent
Sugisawa et al.

(10) Patent No.: US 10,750,142 B2
(45) Date of Patent: Aug. 18, 2020

(54) IMAGE PROJECTION SYSTEM, IMAGE PROJECTION DEVICE, AND IMAGE PROJECTION METHOD

(71) Applicant: PANASONIC INTELLECTUAL PROPERTY MANAGEMENT CO., LTD., Osaka (JP)

(72) Inventors: Yuji Sugisawa, Fukuoka (JP); Ryuji Fuchikami, Fukuoka (JP); Hideyuki Nakamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/468,638

(22) PCT Filed: Sep. 22, 2017

(86) PCT No.: PCT/JP2017/034231
§ 371 (c)(1),
(2) Date: Jun. 11, 2019

(87) PCT Pub. No.: WO2018/110022
PCT Pub. Date: Jun. 21, 2018

(65) Prior Publication Data
US 2020/0099906 A1    Mar. 26, 2020

(30) Foreign Application Priority Data

Dec. 13, 2016    (JP) .................................. 2016-241378

(51) Int. Cl.
*H04N 9/31* (2006.01)
*G03B 21/14* (2006.01)
*G06K 9/00* (2006.01)

(52) U.S. Cl.
CPC ....... *H04N 9/3185* (2013.01); *G06K 9/00255* (2013.01)

(58) Field of Classification Search
CPC ............... H04N 9/3185; H04N 9/3194; G06K 9/00255; G03B 21/14
See application file for complete search history.

(56) References Cited

U.S. PATENT DOCUMENTS 6,554,431 B1 * 4/2003 Binsted .................... H04N 5/74
                                                       348/E5.137
9,832,436 B1    11/2017 Fuchikami et al.
(Continued)

FOREIGN PATENT DOCUMENTS

JP    2004-062560    2/2004
JP    2009-282270    12/2009
(Continued)

OTHER PUBLICATIONS

International Search Report issued in International Patent Application No. PCT/JP2017/034231, dated Dec. 19, 2017.

*Primary Examiner* — Ryan D Howard
(74) *Attorney, Agent, or Firm* — Greenblum & Bernstein, P.L.C.

(57) ABSTRACT

In an image projection system, a computing device generates conversion information for converting camera coordinates used by an imaging device and projector coordinates used by an image projection device based on a positional relationship between a projection pattern image and an imaging pattern image, the imaging device images a subject including a person, the computing device detects a first position indicating a position related to the camera coordinates in a specific region in the person, the computing device converts information on the first position into information on a second position indicating a position related to the projector coordinates in the specific region based on the con-
(Continued)

version information, and the image projection device projects a warning image for overlapping with an entire region of the specific region based on the information on the second position.

7 Claims, 18 Drawing Sheets

(56) References Cited

U.S. PATENT DOCUMENTS

| | | |
|---|---|---|
| 2004/0081338 A1 | 4/2004 | Takenaka |
| 2005/0226461 A1 | 10/2005 | Goldberg et al. |
| 2006/0140409 A1 | 6/2006 | Sharma |
| 2006/0159302 A1 | 7/2006 | Goldberg et al. |
| 2007/0242852 A1 | 10/2007 | Kumoluyi |
| 2016/0088275 A1 | 3/2016 | Fuchikami |

FOREIGN PATENT DOCUMENTS

| | | |
|---|---|---|
| JP | 2013-161400 | 8/2013 |
| JP | 2015-173431 | 10/2015 |

* cited by examiner

FIG. 17
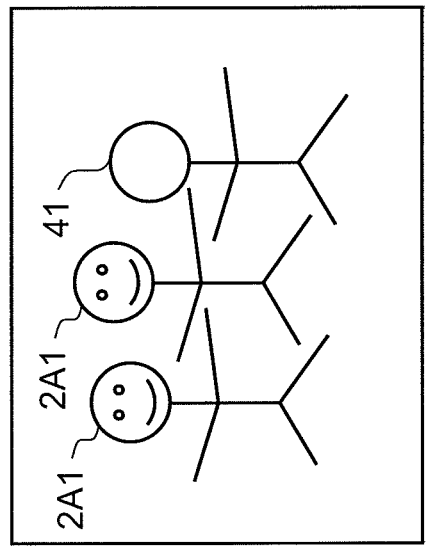
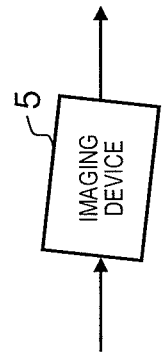
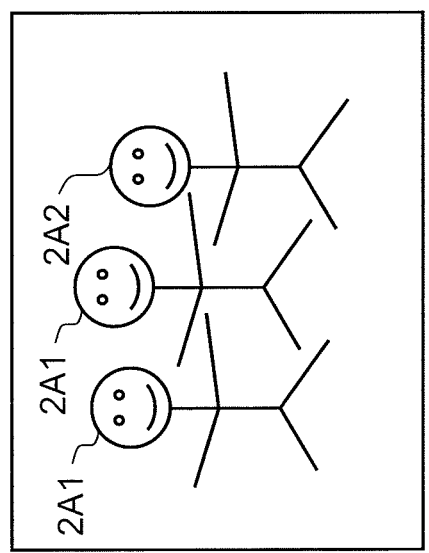

FIG. 18
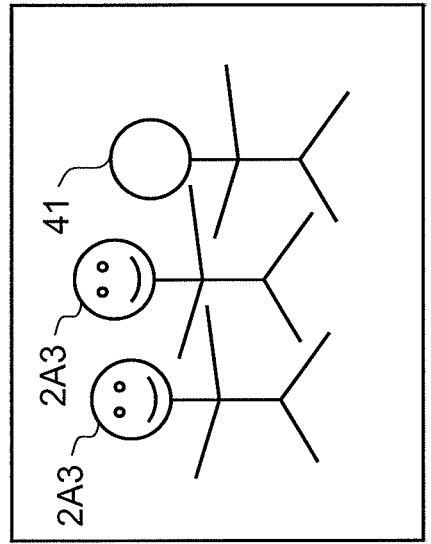
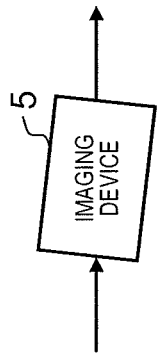
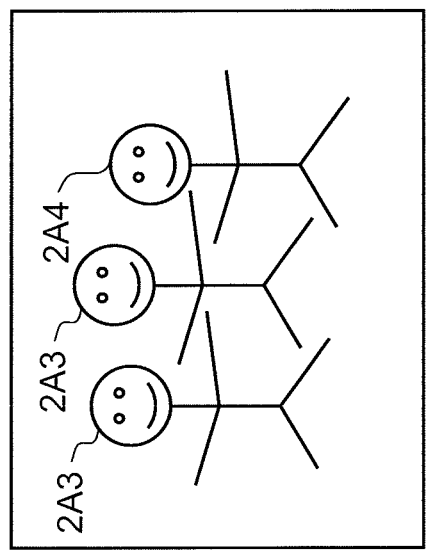

IMAGE PROJECTION SYSTEM, IMAGE PROJECTION DEVICE, AND IMAGE PROJECTION METHOD

TECHNICAL FIELD

The present disclosure relates to an image projection system, an image projection device, and an image projection method.

BACKGROUND ART

A surreptitious photographing prevention device described in PTL 1 includes a light source device, a projection lens system, and a control unit. The light source device is configured of infrared light and generates interference light that degrades a video content. The lens system projects the interference light emitted from the light source device toward a screen. The control unit controls the light source device so as to generate the interference light at a predetermined time interval or at an irregular time interval. The surreptitious photographing prevention device superimposes and projects temporally and intermittently the generated interference light on the video content to be projected on the screen.

However, even when there is a portion in the video content for which confirmation is desired, the interference light may be superimposed on the portion to reduce a visibility and it may be difficult to confirm the portion. For example, when the interference light is superimposed on the entire subject including a person, it may be impossible to grasp the person at all.

An object of the present disclosure is to reduce the visibility by limiting to a part of image regions in a captured image.

CITATION LIST

Patent Literature

PTL 1: Japanese Patent Unexamined Publication No. 2009-282270

SUMMARY OF THE INVENTION

The image projection system of the present disclosure includes an image projection device that projects an image using non-visible light, an imaging device, and a computing device. The computing device generates conversion information for converting camera coordinates used by the imaging device and projector coordinates used by the image projection device based on a positional relationship between a predetermined pattern image projected by the image projection device and the predetermined pattern image captured by the imaging device. The imaging device images a subject including a person. The computing device detects a first position indicating a position related to the camera coordinates in a face region of the person. The computing device converts information on the first position into information on a second position indicating a position related to the projector coordinates in the face region based on the conversion information. The image projection device projects a warning image for overlapping with an entire region of the face region based on the information on the second position.

An image projection device of the present disclosure includes a projector that projects an image using infrared light, an acquisition unit that acquires an image captured by an imaging device, and a processing unit that generates conversion information for converting camera coordinates used by the imaging device and projector coordinates used by the image projection device based on a positional relationship between a predetermined pattern image projected by the projector and the predetermined pattern image captured by the imaging device. The processing unit detects a first position indicating a position related to the camera coordinates in a face region of a person included in a subject imaged by the imaging device and converts information on the first position into information on a second position indicating a position related to the projector coordinates in the face region based on the conversion information. The projector projects a warning image based on the information on the second position.

An image projection method of the present disclosure is an image projection method in an image projection system, the method including projecting a first pattern image projected by an image projection device, causing an imaging device to image the first pattern image to acquire a second pattern image, generating conversion information for converting camera coordinates used by the imaging device and projector coordinates used by the image projection device based on a positional relationship between the first pattern image and the second pattern image, imaging a subject including a person by the imaging device, detecting a first position indicating a position related to the camera coordinates in a face region in the person, converting information on the first position into information on a second position indicating a position related to the projector coordinates in the face region based on the conversion information, and causing the image projection device to project a warning image for overlapping with an entire region of the face region based on the information on the second position.

According to the present disclosure, it is possible to reduce the visibility by limiting to a part of image regions in a captured image.

BRIEF DESCRIPTION OF DRAWINGS

FIG. 17 is a schematic view illustrating a first projection example of the content image in a case where there are a plurality of persons.

FIG. 18 is a schematic view illustrating a second projection example of the content image in a case where there are a plurality of persons.

DESCRIPTION OF EMBODIMENTS

Hereinafter, exemplary embodiments will be described in detail while appropriately referring to the accompanying drawings. There is a case where unnecessarily detailed description is omitted. For example, there is a case where detailed description of an item, which is already well known, and duplicated description with respect to substantially the same configuration are omitted. The reason for this is to avoid description, below, being unnecessarily redundant for easy understanding of those skilled in the art. Also, the accompanying drawings and description below are provided to make those skilled in the art sufficiently understand the present disclosure, and do not intend to limit subjects disclosed in claims.

First Exemplary Embodiment

[Configuration of Image Projection System]

Figure 1:
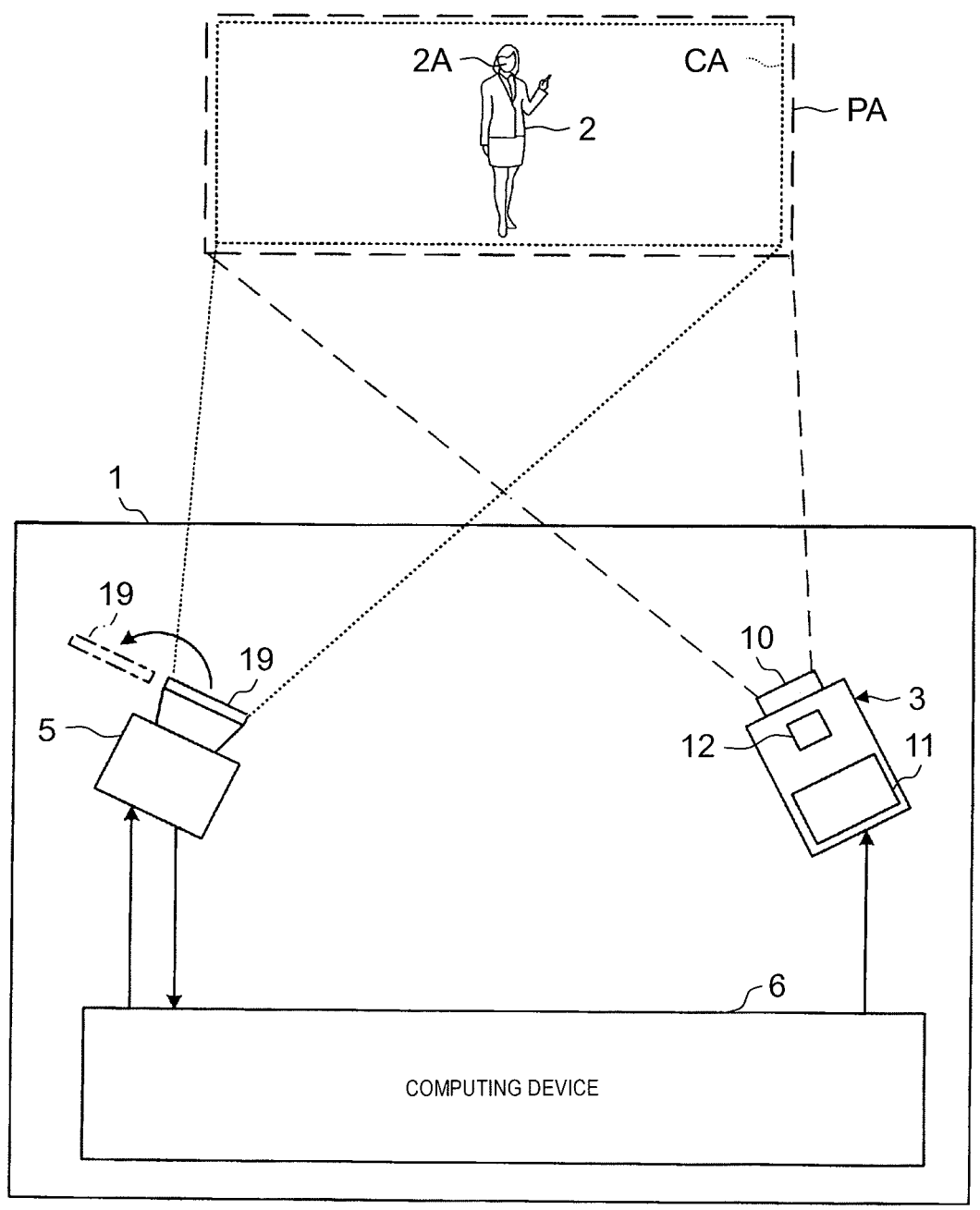
FIG. 1 is a configuration diagram illustrating an example of an image projection system in a first exemplary embodiment.

FIG. 1 is a configuration diagram illustrating an example of image projection system 1 in a first exemplary embodiment. Image projection system 1 implements projection mapping for projecting an image constituting a desired video content on a projection target. Image projection system 1 can project a moving image on a projection target (for example, person 2). Person 2 is, for example, a dancer, an athlete, or the like. Person 2 may be a changing person (moving object) or a non-changing person (stationary object).

Image projection system 1 includes infrared light projection device 3, imaging device 5, and computing device 6. Infrared light projection device 3 projects an infrared image toward a projection target including person 2. Imaging device 5 images an infrared image and a visible light image projected on an imaging target including person 2. Computing device 6 is communicably connected to infrared light projection device 3 and imaging device 5, and executes various processes related to projection mapping.

Infrared light projection device 3 and the imaging device 5 may be respectively disposed at predetermined positions. Infrared light projection device 3 captures an image in predetermined spatial projection area PA. Projection area PA is fixed. Imaging device 5 images a subject included in predetermined spatial imaging area CA. Imaging area CA is fixed. Projection area PA includes imaging area CA.

Infrared light projection device 3 includes emitter 10, an infrared light source (IR light source) 11, digital mirror device (DMD) 12, a control substrate, a processor, and a memory. The memory stores a program that causes the processor to execute various operation commands in infrared light projection device 3. Emitter 10 includes a lens system such as a projection lens. Infrared light source 11 includes an infrared light emitting diode (LED) that emits light in the infrared region.

DMD 12 selectively reflects light from infrared light source 11 toward the projection lens to form a desired infrared image including moving or still images.

DMD 12 is digitally controllable as compared to liquid crystal type projections. Therefore, DMD 12 has high affinity to digital signals that can adjust light with high accuracy. The control substrate or processor controls the operation of infrared light source 11 or DMD 12.

As infrared light source 11, when desired brightness can be achieved, not only the LED but also other light sources such as laser can be adopted.

Infrared light projection device 3 is an example of an image projection device using non-visible light.

The image projection device for non-visible light may project the non-visible light image using not only infrared light but also other light such as ultraviolet light. The non-visible light is, for example, non-visible light which is not viewed by a person or light according to the non-visible light, and is light which does not greatly affect the viewing of the content image in real space.

Imaging device 5 is a digital video camera suitable for imaging an infrared image and a visible light image. Imaging device 5 includes an image sensor having sensitivity to an infrared wavelength region (IR wavelength region) and a visible light wavelength region. For example, the image sensor has high sensitivity in the near infrared wavelength region (Near Infra Red (NIR) wavelength region). Imaging device 5 may image a moving image or may capture a still image.

Imaging device 5 includes visible light cut filter 19. Visible light cut filter 19 is disposed on the outer side (person 2 side) of the objective lens of imaging device 5. Visible light cut filter 19 is attachable and detachable as illustrated in FIG. 1 and is attached when imaging the infrared image and detached when imaging the visible light image.

Visible light cut filter 19 may be manually attached and detached by a user of image projection system 1. The visible light cut filter may be automatically attached and detached by attaching a filter driving device to imaging device 5. A filter driving device displaces visible light cut filter 19 between a mounting position at which visible light cut filter 19 is mounted on the objective lens of imaging device 5 and a release position away from the objective lens.

Computing device 6 is, for example, a Personal Computer (PC) or a server device. Computing device 6 includes, for example, a communication device, a memory, and a processor. The communication device communicates data wirelessly or by wire with other devices (for example, infrared light projection device 3 and imaging device 5). The memory stores various data items. The processor includes, for example, a central processing unit (CPU), a digital signal processor (DSP), or a graphical processing unit (GPU). The processor performs calibration described later, conversion of camera coordinates and projector coordinates, projection of a content image using infrared light, and the like. That is, the memory stores a program that causes the processor to execute various operation instructions in computing device 6.

Figure 2:
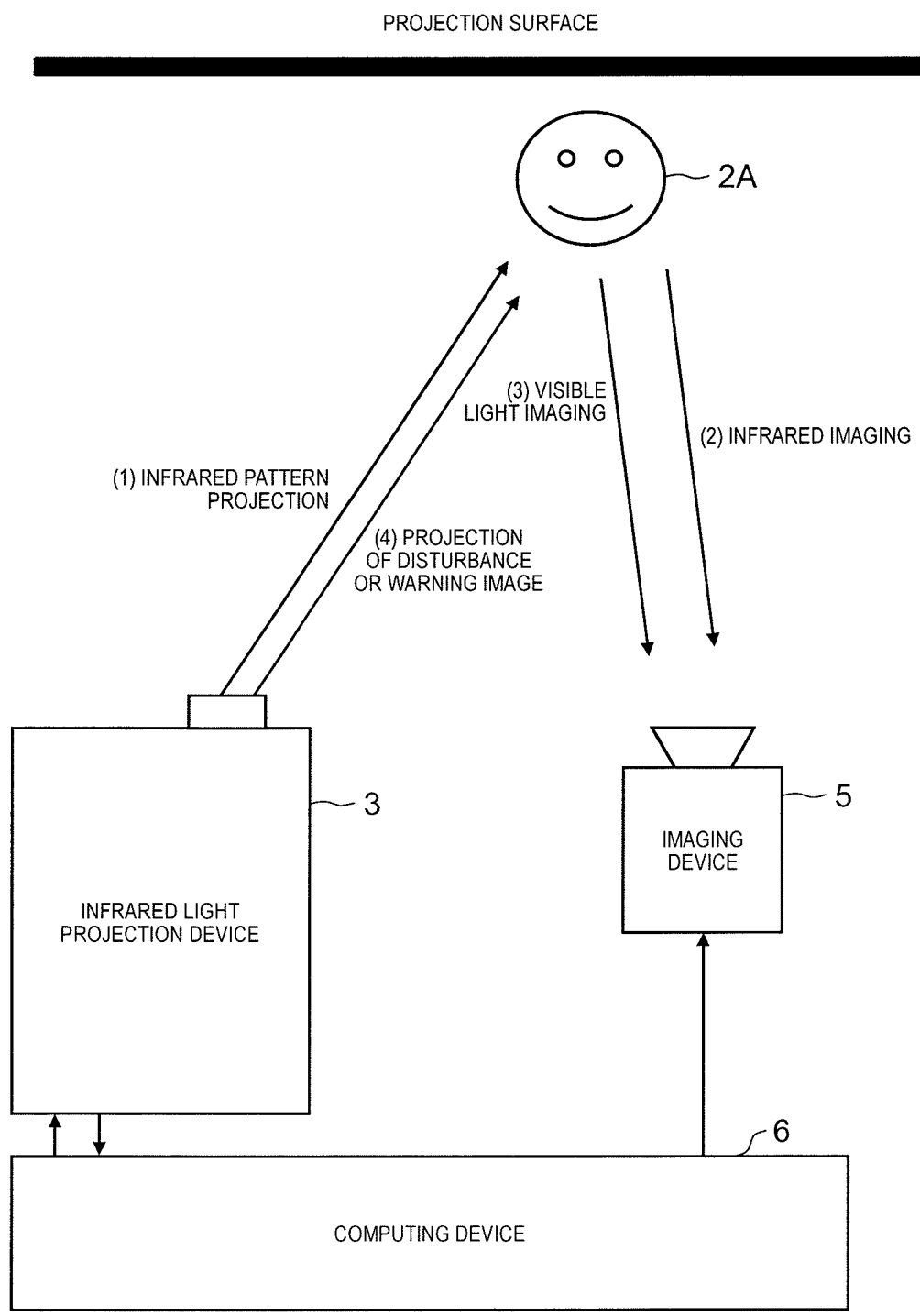
FIG. 2 is an explanatory view illustrating an operation outline of the image projection system.

FIG. 2 is an explanatory view illustrating an operation outline of image projection system 1. As will be described in detail later, in image projection system 1, infrared light projection device 3 irradiates a pattern image composed of a plurality of predetermined patterns (frames) onto the projection area PA (predetermined projection plane) as an infrared image. Imaging device 5 images the projected pattern image included in the imaging area CA. In this case, imaging device 5 images a pattern image through the visible light cut filter.

Computing device 6 performs calibration based on the pattern image (projection pattern image) projected by infrared light projection device 3 and the pattern image (imaging pattern image) imaged by imaging device 5. In the calibration, computing device 6 generates a conversion table for converting the coordinates of the camera coordinate system (camera coordinates) used by imaging device 5 and the coordinates of the projector coordinate system (projector coordinates) used by infrared light projection device 3 based on the positional relationship between the projection pattern image and the imaging pattern image. By the calibration, image projection system 1 can associate each pixel in the image (projected image) projected by infrared light projection device 3 and the image (captured image) captured by imaging device 5. The projection image is, for example, a content image to be projected. A conversion table including conversion parameters between pixels obtained by calibration is used to correct the projection position of the projection image by infrared light projection device 3.

After calibration, imaging device 5 images a subject including the person 2 located in imaging area CA without passing through visible light cut filter 19. Computing device 6 detects face region 2A included in person 2. The position of detected face region 2A is indicated by camera coordinates. Therefore, the computing device 6 converts the position of the detected face region 2A into projector coordinates based on the conversion table. Infrared light projection device 3 projects a content image (for example, a warning image) so as to overlap entire face region 2A based on the position of face region 2A expressed in projector coordinates.

Accordingly, even when infrared light projection device 3 and imaging device 5 are disposed at different positions, image projection system 1 can project the content image onto the face region of person 2 to be imaged by correlating the camera coordinates with the projector coordinates. Therefore, image projection system 1 can superimpose the warning image according to the face which is a specific region of person 2 to be imaged. Therefore, even if a checker of the captured image confirms the captured image, it is difficult to specify the face of the person 2.

[Specific Example of Projection Pattern Image]

Figure 3:
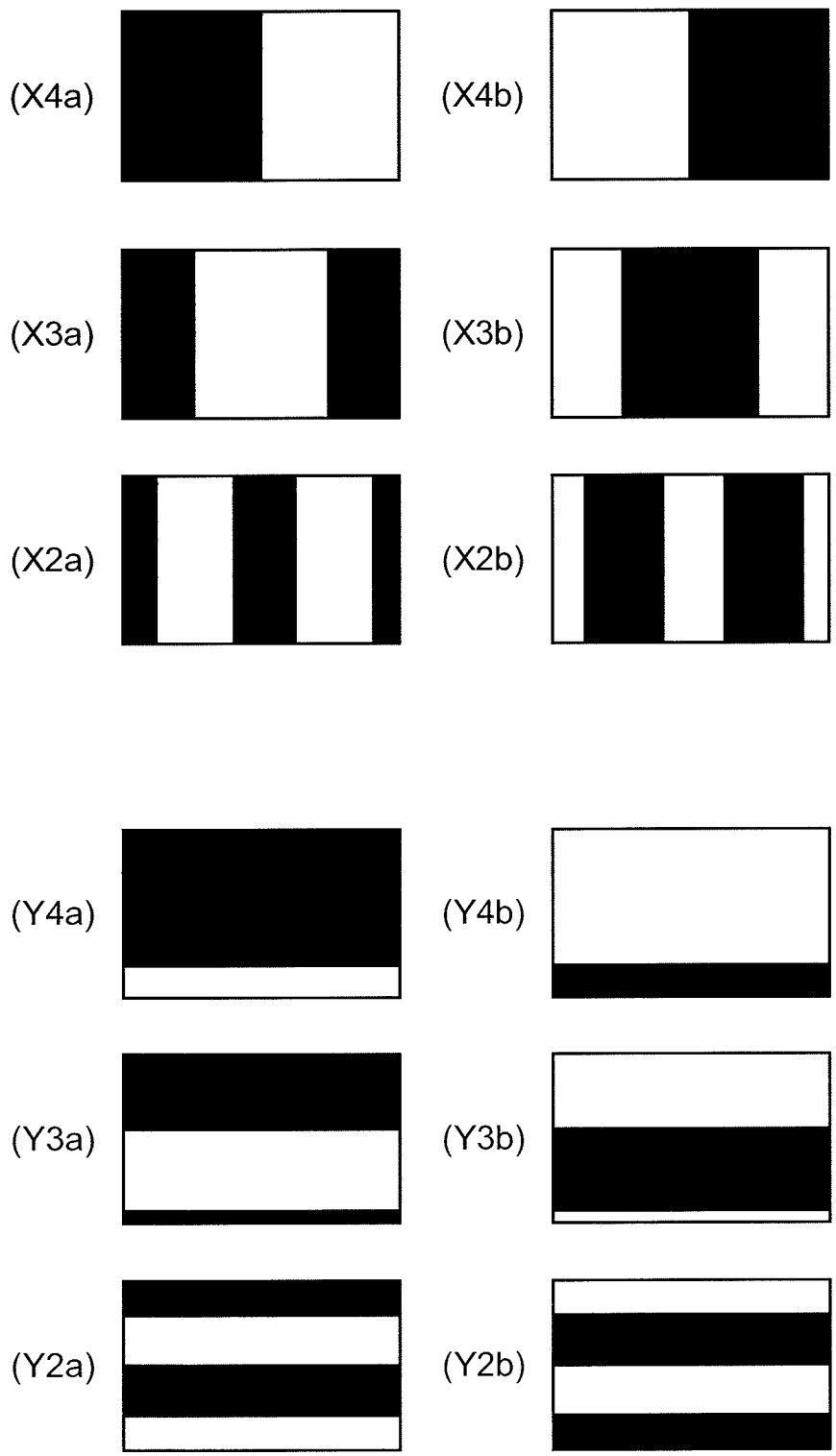
FIG. 3 is an explanatory view illustrating an example of a projection pattern image.

FIG. 3 is an explanatory view illustrating an example of a projection pattern image. The projection pattern image is obtained by Manchester-encoding each bit obtained by gray-coding an X coordinate and a Y coordinate of the DMD 12 having a predetermined number of pixels (for example, 1024×768 pixels) and expressing it as a black and white binary image. Here, according to the two-dimensional space coding method, the projection pattern image and the imaging pattern image are used to associate positional information in projector coordinates with positional information in camera coordinates.

For example, coordinate information is encoded by allocating 10 bits to both the X coordinate and the Y coordinate. In FIG. 3, the X coordinate is a coordinate indicating the position in the horizontal direction, and the Y coordinate is a coordinate indicating the position in the vertical direction. In FIG. 2, X4$a$ and X4$b$ are a pattern image indicating the ninth bit which is the most significant bit of the X coordinate and a pattern image inverted in luminance as a complementary image thereof. X3$a$ and X3$b$ are a pattern image indicating the eighth bit of the X coordinate and a pattern image inverted in luminance as a complementary image thereof. X2$a$ and X2$b$ are a pattern image showing a seventh bit of the X coordinate and a pattern image inverted in luminance as a complementary image thereof.

In addition, in FIG. 3, Y4$a$ and Y4$b$ are a pattern image indicating a ninth bit which is the most significant bit of the Y coordinate and a pattern image inverted in luminance as the complementary image thereof. Y3$a$ and Y3$b$ are a pattern image indicating the eighth bit of the Y coordinate and a pattern image inverted in luminance as the complementary image thereof. Y2$a$ and Y2$b$ are a pattern image indicating the seventh bit of the Y coordinate and a pattern image inverted in luminance as a complementary image thereof.

Although illustration is omitted, when 10 bits are assigned to both the X and Y coordinates, a total of 40 patterns are set up to the pattern indicating the 0th-bit on both the X and Y coordinates. Density information on each pixel is subjected to noise removal based on the difference signal of the image pair complementary to each other.

Infrared light projection device 3 sequentially projects a projection pattern image including such 20 pairs of mutually complementary image pairs onto person 2 within a predetermined time. Imaging device 5 images a projection pattern image to generate an imaging pattern image. Computing device 6 compares the projection pattern image with the imaging pattern image. Thus, computing device 6 can associate each pixel in the projection image with each pixel in the captured image. In addition, computing device 6 can execute a process of tracking changing person 2.

In addition, although it is 1024×768 pixel and illustrated that the number of image patterns is 40 sheets (40 frames) here, the number of image patterns changes with resolution or the desired precision. Further, depending on the installation conditions of imaging device 5 and infrared light projection device 3, either the Y coordinate or the X coordinate may be associated in a fixed manner by imaging device 5 and infrared light projection device 3. Further, the deviation between the camera coordinate system and the projector coordinate system may be set to be limited to a narrow range in projection area PA and imaging area CA. Accordingly, image projection system 1 can reduce the coordinate code of either one of the X coordinate and the Y coordinate, or can reduce the coordinate code substantially.

[Configuration of Computing Device]

Figure 4:
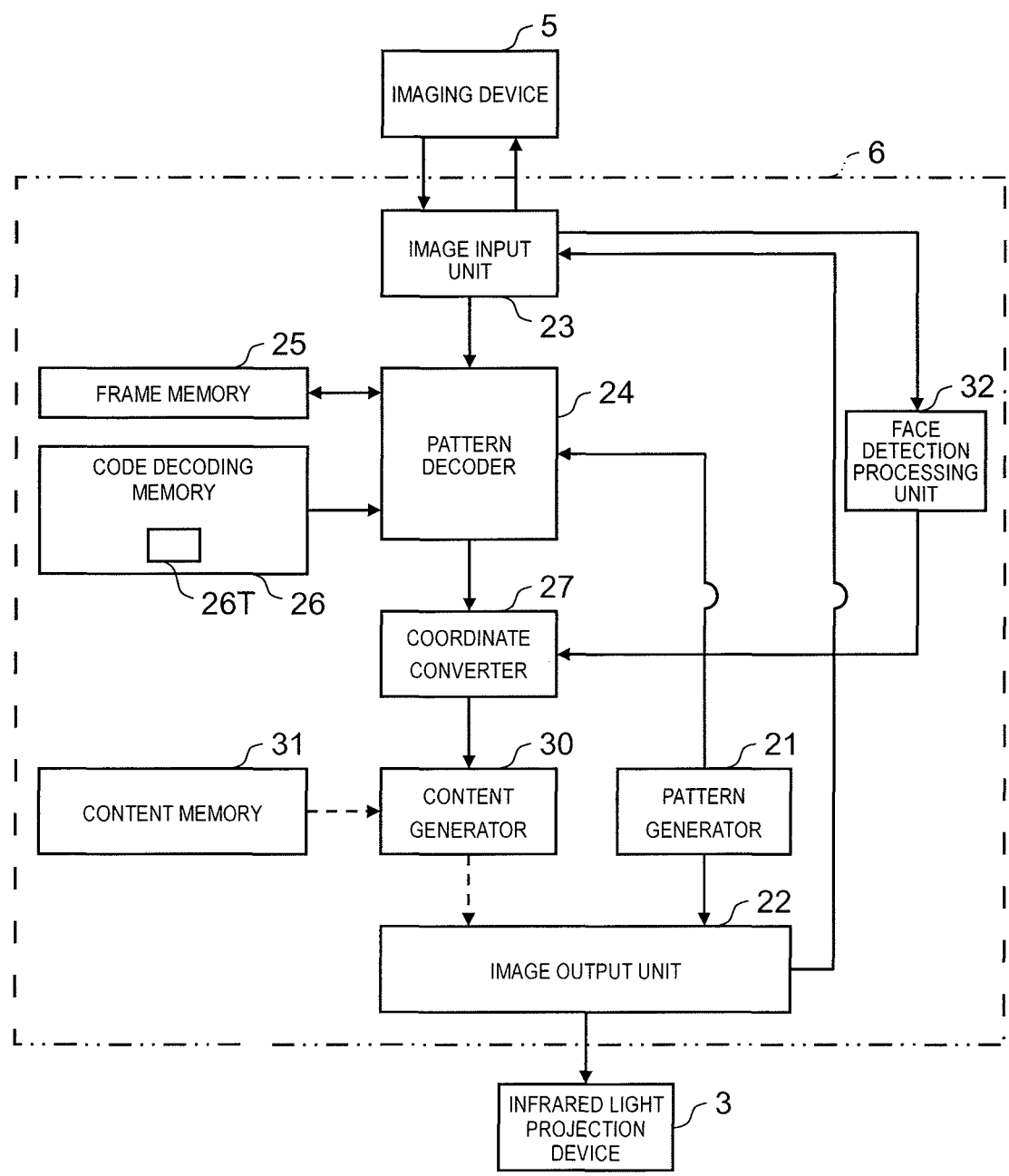
FIG. 4 is a block diagram illustrating a functional configuration example of a computing device in the first exemplary embodiment.

FIG. 4 is a block diagram illustrating a functional configuration example of computing device 6.

Computing device 6 includes pattern generator 21, image output unit 22, image input unit 23, pattern decoder 24, frame memory 25, code decoding memory 26, coordinate converter 27, content generator 30, content memory 31, and face detection processing unit 32.

Pattern generator 21 stores the projection pattern image illustrated in FIG. 3. Pattern generator 21 sequentially outputs information on each pattern constituting the projection pattern image to image output unit 22 at a predetermined timing.

Image output unit 22 supplies infrared light projection device 3 with an image signal corresponding to each pattern of the projection pattern image. Image output unit 22 transmits the image output timing of the projection pattern image to image input unit 23.

Image input unit 23 controls imaging device 5 to perform imaging in synchronization with image output unit 22. Image input unit 23 acquires and inputs a captured image captured by imaging device 5. Acquisition of the captured image is performed by, for example, wired or wireless communication. Wired communication includes, for example, a coaxial cable, power line communication (PLC), and digital enhanced cordless telecommunications (DECT). The wireless communication includes, for example, a wireless local area network (LAN) and Bluetooth (registered trademark). The captured image includes, for example, an imaging pattern image and an image including a subject such as person 2 or the like. In addition, the captured image includes an infrared image (for example, a projection pattern image) and a visible light image. Image input unit 23 sends the input imaging pattern image to pattern decoder 24. Image input unit 23 sends a captured image including a subject including person 2 to face detection processing unit 32.

When pattern decoder 24 acquires the first of a pair of the complementary images (hereinafter referred to as the other image) for the imaging pattern image from image input unit 23, the pattern decoder stores the acquired image in frame memory 25. When pattern decoder 24 acquires the second (here, one) of the complementary image pair with respect to the imaging pattern image from image input unit 23, pattern decoder 24 calculates a difference between frames with one of the complementary image pair and the other of the complementary image pair previously stored in frame memory 25. Accordingly, image projection system 1 can easily determine the pixel value (here, the binary value of "0" and "1") of the imaging pattern image while suppressing the influence of ambient light and the like.

Code decoding memory 26 is provided with a writing region for each pixel (each pixel of a captured image) of imaging device 5. After calculating the difference, pattern decoder 24 writes each bit value of the gray-coded coordinate data in a writing region corresponding to each pixel in code decoding memory 26 in bit units. Pattern decoder 24 executes the process for the number of image patterns (for example, 40 frames) and obtains a 10 bit value indicating each of the X coordinate and the Y coordinate of each pixel (projector coordinate system) of the infrared image of infrared light projection device 3 corresponding to each pixel (camera coordinate system) of the captured image of imaging device 5. Pattern decoder 24 writes the value of 10 bits in code decoding memory 26.

In this manner, code decoding memory 26 finally stores the correspondence information on each pixel between the projection image (for example, projection pattern image) and the captured image (imaging pattern image). Each time one complementary image pair is processed by pattern decoder 24, the latest pixel correspondence information is obtained. That is, code decoding memory 26 holds, for each pixel, correspondence information between projector coordinates and camera coordinates. The correspondence information on each pixel is included in conversion table 26T of code decoding memory 26.

The face detection processing unit 32 detects face region 2A of person 2 included in the captured image from image input unit 23. The detection of face region 2A is performed by, for example, the Viola-Jones method. Face detection processing unit 32 sends the detected positional information on face region 2A of person 2, that is, the coordinates (camera coordinates) of face region 2A to coordinate converter 27.

Coordinate converter 27 converts the position of each pixel of the captured image from camera coordinates to projector coordinates based on the correspondence information held in conversion table 26T. That is, coordinate converter 27 receives the camera coordinates of face region 2A from face detection processing unit 32, and converts the camera coordinates of face region 2A into projector coordinates with reference to conversion table 26T.

Content memory 31 stores data (for example, character data, texture data, moving image data, mesh data, a shader program, or the like) as a material of an image (for example, content image) to be projected onto person 2. The data is read by content generator 30 in response to a request from content generator 30.

Content generator 30 generates a content image to be mapped to face region 2A of person 2 based on the calibration information, that is, the correspondence information of conversion table 26T.

The content images for projection are sequentially output toward image output unit 22. The content image includes, for example, a warning image for warning the camera imager or interrupting the image captured by the camera. Therefore, the warning image can be considered to be a disturbing image.

Content generator 30 receives information on projector coordinates of face region 2A from coordinate converter 27. Content generator 30 generates information (projection positional information) of the position where the content image is projected, based on the projector coordinates of face region 2A. For example, content generator 30 generates projection positional information by matching the central coordinates of face region 2A with the central coordinates of the content image.

Content generator 30 generates information on the size (content size) on which the content image is projected. Content generator 30 makes the content size equal to face region 2A or wider than face region 2A. That is, the face region 2A is covered with the content image projected by infrared light projection device 3. The content size may be input by the user via an operator of computing device 6 if the content size is equal to or larger than face region 2A.

The content generator 30 generates information on a shape (content shape) on which the content image is projected. Content generator 30 may set the shape of the content image corresponding to face region 2A to be the same as the detected shape of face region 2A, or may be simpler than the detected shape of the face region 2A (for example, circular or rectangular, and other polygonal shapes). The content shape may be a shape of a content image held in advance in content memory 31 without being specially determined. In this case, content generator 30 does not generate content shape information.

Image output unit 22 receives a content image, projection positional information, content size information, and content shape information from content generator 30, and an infrared image signal based on the content image, projection positional information, content size information, and content shape information is supplied to infrared light projection device 3.

Computing device 6 is, for example, a computer provided with general-purpose hardware. Computing device 6 may include for example, a processor that executes information processing on the basis of a predetermined control program, a volatile memory that functions as a working area such as a processor, a nonvolatile memory for storing control programs and data executed by the processor, and the like. Computing device 6 may be configured to include an integrated circuit including an application specific integrated circuit (ASIC) and a field programmable gateway (FPGA). In addition, as in the third exemplary embodiment described later, a configuration in which a function similar to at least a part of the function of computing device 6 is added to at least one of infrared light projection device 3 and imaging device 5 is also possible.

[Operation of Image Projection System]

Next, an operation example of image projection system 1 will be described.

Figure 5:
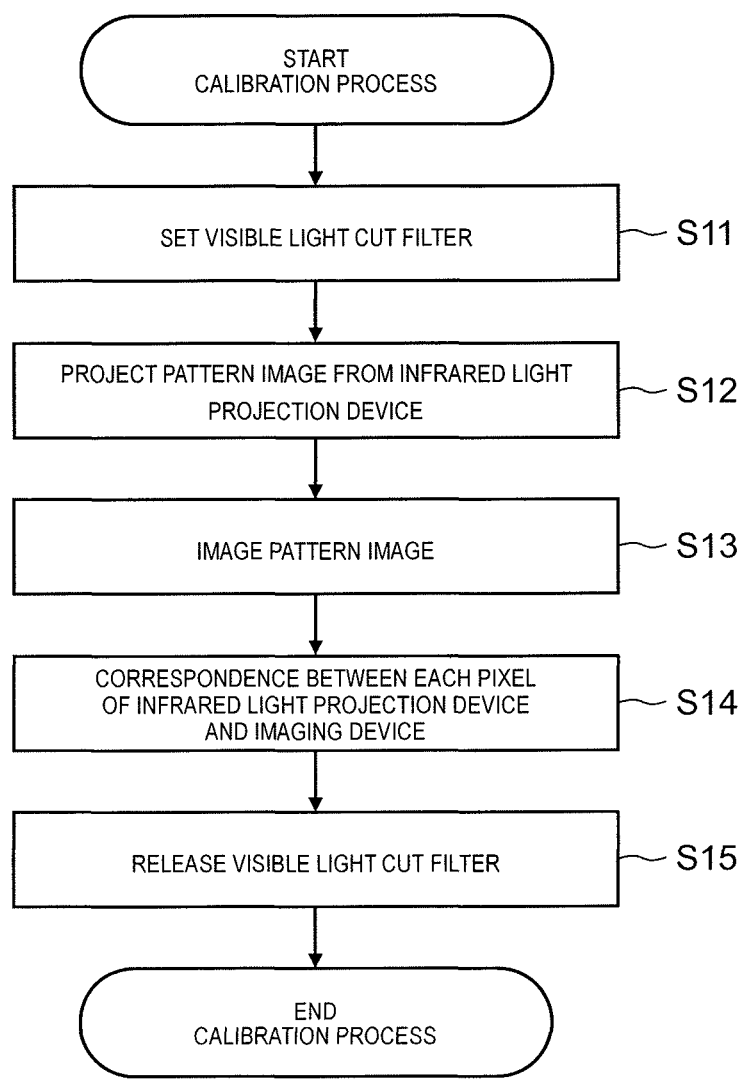
FIG. 5 is a flowchart illustrating an example of a calibration process of the image projection system.

FIG. 5 is a flowchart illustrating an example of a calibration process of image projection system 1. Image projection system 1 executes calibration before projecting the content image by infrared light projection device 3 (for example, when changing the zoom setting or the focus setting in infrared light projection device 3 or changing the zoom setting or the focus setting of imaging device 5).

First, visible light cut filter 19 is attached to the objective lens of imaging device 5 (S11).

Infrared light projection device 3 projects the projection pattern image onto the projection area PA (S12). Imaging device 5 images the projection pattern image in the imaging area CA to obtain the imaging pattern image (S13). Here, visible light cut filter 19 is attached to imaging device 5 (that is, the visible light cutting is in an effective state), and imaging device 5 blocks the visible light region and transmits the infrared region. That is, the imaging pattern image as the captured image is an infrared image. Imaging device 5 sends an imaging pattern image to computing device 6.

In computing device 6, image input unit 23 acquires an imaging pattern image from computing device 6 and sends the image to pattern decoder 24. Pattern decoder 24 associates each pixel of the infrared image (projected image) projected by infrared light projection device 3 with the captured image captured by imaging device 5 based on the imaging pattern image from image input unit 23 (S14). Pattern decoder 24 generates conversion table 26T including the information on the association of each pixel. Conversion table 26T is held in code decoding memory 26.

When the generation of conversion table 26T is completed, visible light cut filter 19 of imaging device 5 is released. That is, visible light cut filter 19 is removed from the objective lens of imaging device 5 (S15). Thereby, the calibration process is completed, and imaging device 5 can perform imaging with visible light.

According to the calibration process illustrated in FIG. 5, even when imaging area CA by imaging device 5 and projection area PA by infrared light projection device 3 are different, camera coordinates and projector coordinates can be associated using conversion table 26T. Therefore, image projection system 1 can reduce the effort of exactly aligning projection area PA and imaging area CA. In addition, since image projection system 1 can automatically associate the camera coordinates with the projector coordinates by using conversion table 26T, it is possible to reduce a manual adjustment error and improve the calibration accuracy.

Figure 6:
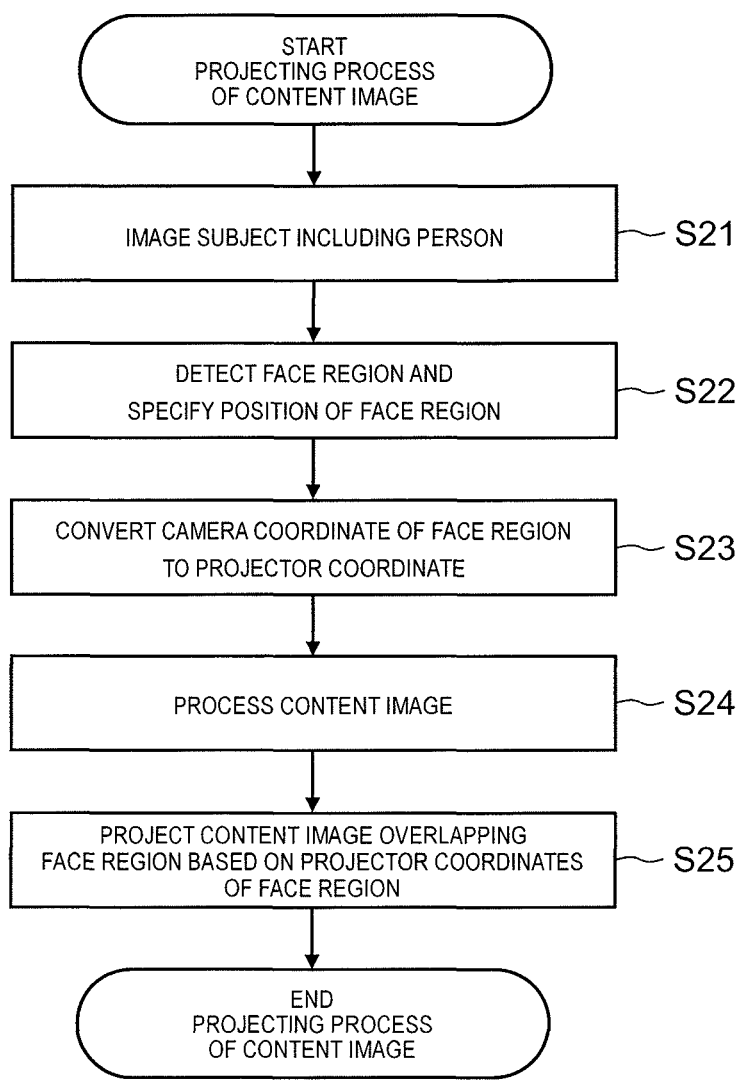
FIG. 6 is a flowchart illustrating an example of a projection process of a content image (warning image) in consideration of a face region of a person.

FIG. 6 is a flowchart illustrating an example of a projection process of a content image (warning image) in consideration of face region 2A of person 2. The projection process of the content in consideration of face region 2A of person 2 is performed after the calibration process shown in FIG. 5.

First, an imaging area including person 2 is imaged by imaging device 5 (S21). Imaging device 5 sends the captured image (captured image) to computing device 6.

In computing device 6, image input unit 23 acquires a captured image from imaging device 5 and sends the image to face detection processing unit 32. Face detection processing unit 32 detects face region 2A of person 2 included in the captured image (S22). Face detection processing unit 32 outputs positional information (here, coordinate information in the camera coordinate system) of detected face region 2A to coordinate converter 27.

Coordinate converter 27 refers to conversion table 26T, and converts each pixel into camera coordinate projector coordinates of face region 2A (S23). Coordinate converter 27 sends information on the projector coordinates of face region 2A to content generator 30.

Content generator 30 acquires the content image from content memory 31, and processes the content image based on face region 2A (S24). For example, content generator 30 changes the size of the content image in accordance with the size of face region 2A. Content generator 30 generates a content image having the same size of face region 2A or a size larger than that of face region 2A. If the area of face region 2A overlaps the area of the content image and is hidden by face region 2A, the shape of the content image is random. Content generator 30 generates projection positional information on the content image related to a projection position where the content image overlaps with entire face region 2A based on the projector coordinates of face region 2A. Content generator 30 sends the generated (for example, processed) content image and the projection positional information on the content image to image output unit 22. Image output unit 22 sends the content image from content generator 30 and the projection positional information on the content image to infrared light projection device 3. The size information and the shape information on the content may be sent to infrared light projection device 3.

Infrared light projection device 3 acquires the content image from computing device 6 and the projection positional information on the content image. Infrared light projection device 3 projects the content image with the determined content size and content shape at the position based on the coordinate information of the projector coordinate system of face region 2A (S25). Infrared light projection device 3 projects the content image, for example, by matching the central coordinates of face region 2A with the central coordinates of the content image.

According to the projection processing of the warning image in consideration of face region 2A of person 2 illustrated in FIG. 6, image projection system 1 projects the warning image using the projector coordinate position with respect to the camera coordinate position of face region 2A. Therefore, face region 2A is covered with the warning image. Therefore, even if imaging device 5 images an imaging area including face region 2A of person 2, a warning image is imaged. Therefore, the user confirming the captured image cannot confirm the face of person 2 present in a real space in face region 2A by the warning image. On the other hand, a part of the region of the captured image other than face region 2A can be confirmed by the user.

Therefore, image projection system 1 can protect the privacy of person 2. In addition, image projection system 1 can appropriately protect the copyright even when person 2 is in a theater or singing, and is in a state in which the copyright or the like may be considered. Further, image projection system 1 can image an image of the region other than face region 2A so as to be visible by imaging device 5 according to the user's request.

In addition, imaging device 5 may always image the subject including person 2, may periodically image, or may image at a time designated by the user or the timer. As the imaging interval is shorter, the followability to the movement of person 2 is higher. Therefore, the followability of the projection position of the warning image to face region 2A of person 2 is enhanced.

[Use Case]

Next, a use case of image projection system 1 of the present exemplary embodiment will be described. As use cases, for example, use cases 1 and 2 shown below can be considered.

Figure 7:
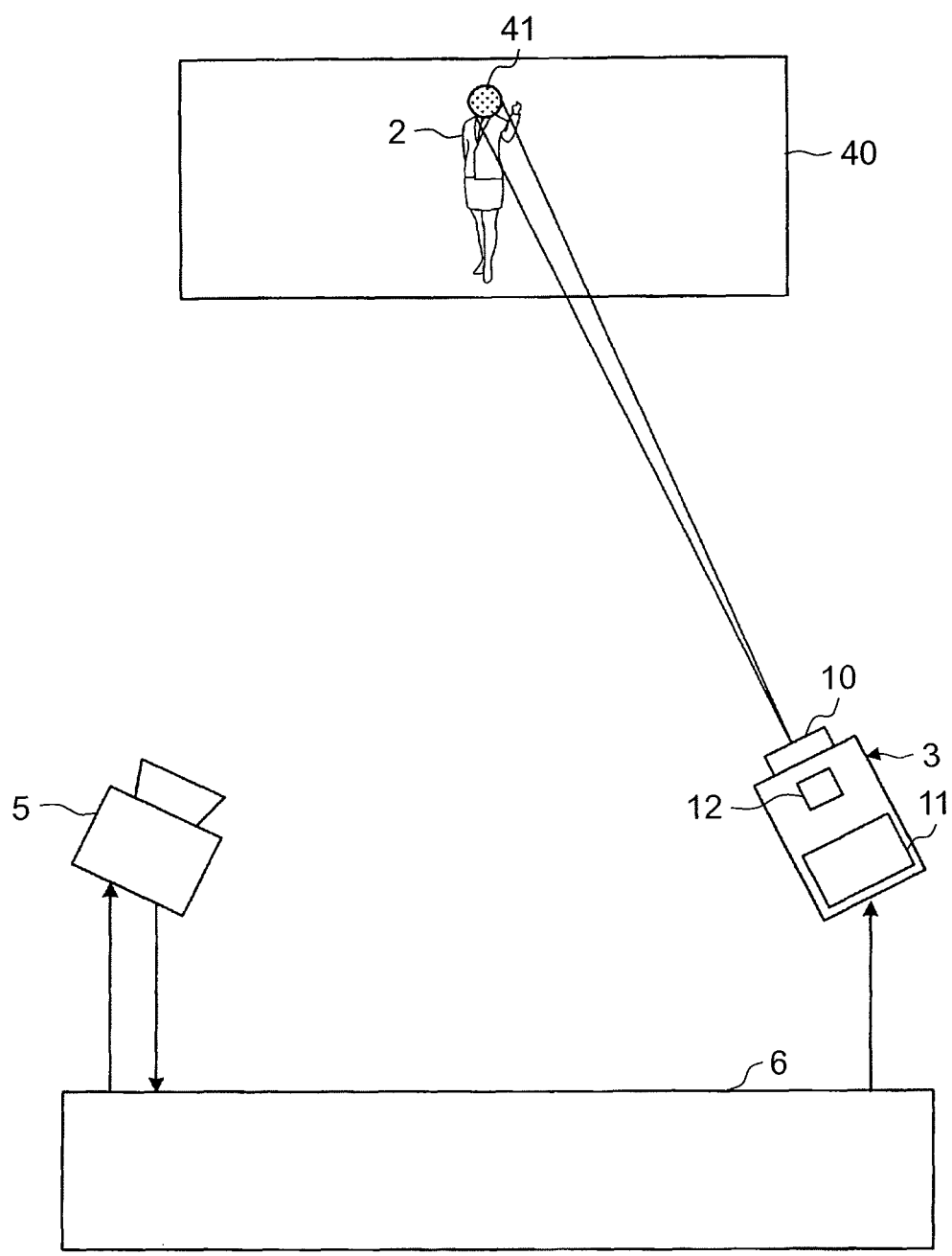
FIG. 7 is a schematic view for illustrating a use case 1.

FIG. 7 is a schematic diagram for illustrating use case 1. In FIG. 7, infrared light projection device 3 projects warning image 41 as a content image on face region 2A of person 2 (here, the performer of stage 40). Accordingly, even when the spectator photographs the performer or the like on stage 40 without permission in the hall where the imaging is prohibited, warning image 41 is reflected in the captured image, and the imaging is inhibited. In addition, the visibility of face region 2A is reduced by warning image 41 being reflected in the captured image. Although FIG. 7 illustrates that warning image 41 is projected in a circular shape, warning image 41 may cover face region 2A, and may have another shape.

When infrared light projection device 3 projects infrared images by relatively strong light in the near infrared region, infrared light projection device 3 can adversely affect the imaged visible light image by warning image 41 even when the spectator uses the camera for imaging visible light for imaging. This is because the image sensor of the camera has some sensitivity to near infrared regions longer in wavelength than visible light.

Figure 8:
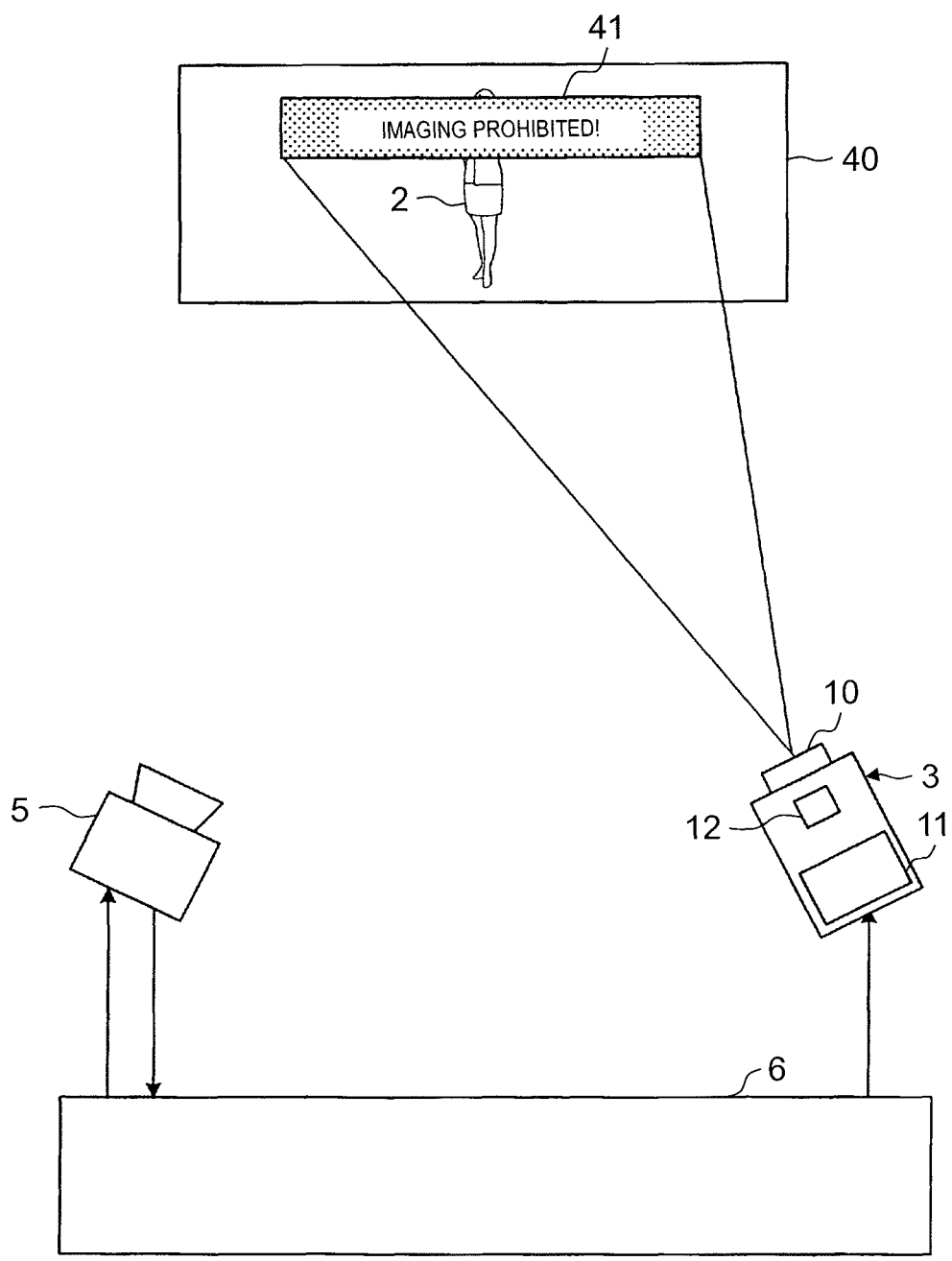
FIG. 8 is a schematic view illustrating a use case 2.

FIG. 8 is a schematic diagram for illustrating use case 2. In FIG. 8, as compared with FIG. 7, warning image 41 including desired character information (here, a warning message "IMAGING PROHIBITED!" To the audience) is used as warning image 41. Accordingly, image projection system 1 can effectively alert the audience who has performed unauthorized photography. Also in FIG. 8, the content image is projected onto face region 2A, and face region 2A is covered with warning image 41. Therefore, image projection system 1 enables the user to confirm a part of the captured image which is not covered by warning image 41 while appropriately protecting the privacy, the copyright and the like by warning image 41.

Figure 9:
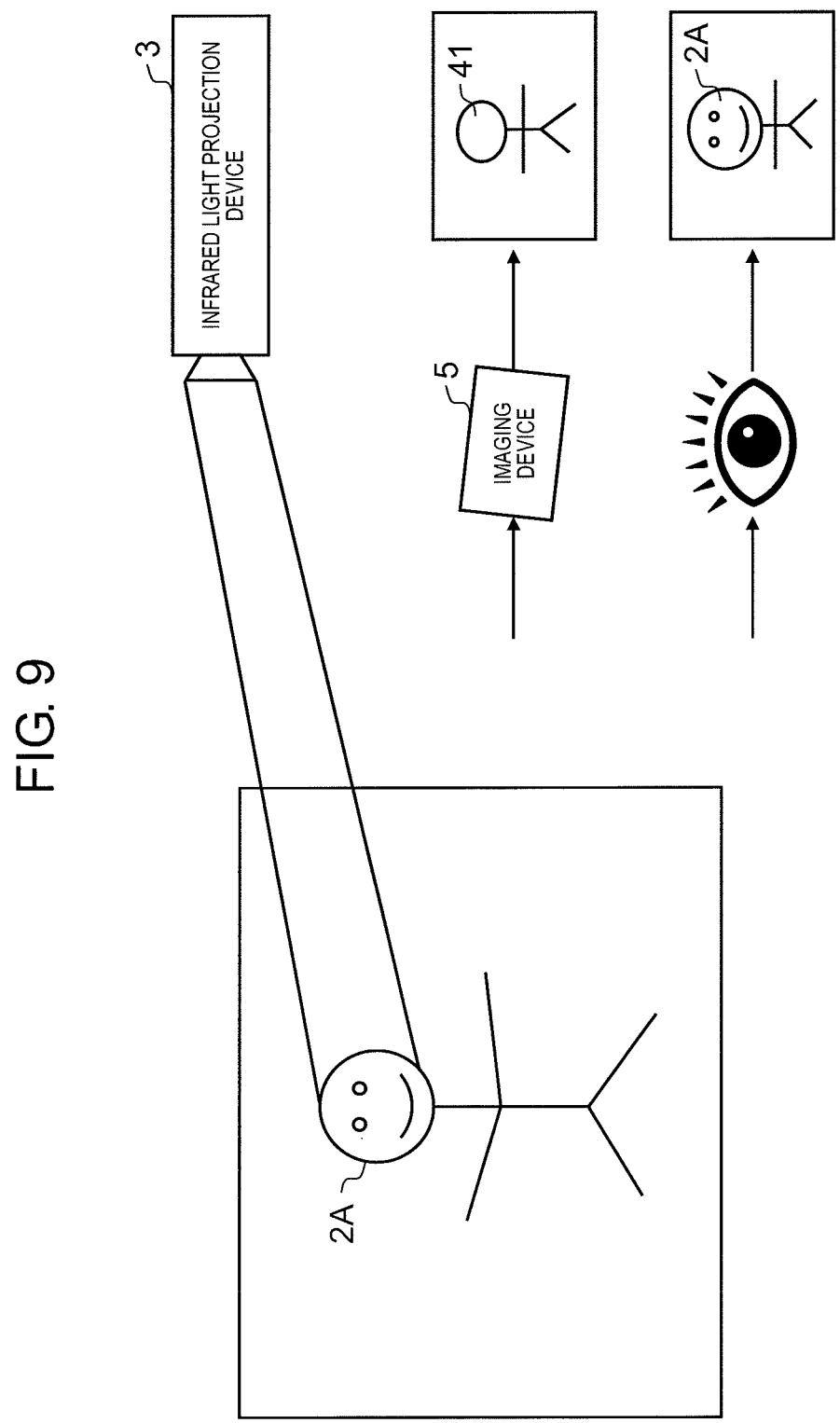
FIG. 9 is a schematic view illustrating a use case 3.

FIG. 9 is a schematic view for illustrating use case 3. FIG. 9 assumes that image projection system 1 is used in a concert hall where shooting is prohibited. For example, infrared light projection device 3 capable of emitting infrared light with high light intensity projects jamming content as warning image 41 overlapping face region 2A. In this case, since warning image 41 cannot be viewed with the naked eye of the spectator, that is, in real space, it is possible to confirm the performer's performance as usual. On the other hand, since warning image 41 is superimposed on face region 2A of the performer by infrared light projection device 3 in the captured image when imaging is performed by the camera included in the smartphone, the face of the performer cannot be confirmed.

In this manner, according to image projection system 1, it is possible to project jamming data in accordance with the scene. Therefore, image projection system 1 can suppress the stealing of the performer's performance by the camera. In addition, since the part other than the performer's face can be confirmed in the captured image, it is possible to confirm the part that the user pays attention while protecting the privacy.

Content generator 30 may generate warning image 41 by inverting each pixel of face region 2A in the captured image in black and white. Accordingly, the pixel values of face region 2A are smoothed, and the features of the image are thinned. In addition, as warning image 41, an advertisement image or a copy prohibited character image may be used. In addition, image projection system 1 may perform control so as not to superimpose warning image 41 on face region 2A for a specific time interval (for example, in a CM when a concert is broadcast on television), and may stop the projection of warning image 41 by infrared light projection device 3, for example.

[Operation Effect or the Like]

As described above, image projection system 1 according to the present exemplary embodiment includes infrared light projection device 3 that projects an image using infrared light, imaging device 5, and computing device 6. Computing device 6 generates conversion information for converting the camera coordinates used by imaging device 5 and the projector coordinates used by infrared light projection device 3 based on the positional relationship between the predetermined pattern image projected by infrared light projection device 3 and the predetermined pattern image captured by imaging device 5. Imaging device 5 images a subject including person 2. Computing device 6 detects a first position indicating a position related to camera coordinates of a specific region of person 2. The computing device 6 converts information on the first position into information on a second position indicating a position related to the projector coordinates in the specific region based on the conversion information. Infrared light projection device 3 projects the warning image for overlapping with the entire region of the specific region based on the information on the second position. The infrared light is an example of non-visible light. Infrared light projection device 3 is an example of an image projection device.

Thus, image projection system 1 can detect a specific region of person 2 and project warning image 41 using infrared light, which is an example of non-visible light, in consideration of the specific region of person 2. Therefore, it is not possible to confirm the specific region in the captured image while grasping the specific region of the person with the naked eye, and it is possible to protect the privacy of person 2 and the copyright of the stage or costume on which person 2 appears. On the other hand, it is possible to confirm regions other than the specific region of person 2. Therefore, image projection system 1 can reduce visibility by limiting it to a part of the imaging region in the captured image while appropriately protecting the privacy, the copyright, and the like in the captured image.

In addition, the specific region in person 2 may be the face region of person 2.

Accordingly, image projection system 1 can perform the face region detection process, which is a detection process with a relatively short processing time, and can improve real-time performance. Therefore, for example, even when person 2 moves around on the stage, infrared light projection device 3 can improve the followability to the movement of face region 2A, and can project the warning image.

In addition, computing device 6 may control the size of the warning image based on the size of face region 2A of person 2.

When person 2 moves, the distance between imaging device 5 and person 2 changes, the size of face region 2A of person 2 changes, and the size of face region 2A in the captured image may change. Even in this case, image projection system 1 can cover the entire region of face region 2A with warning image 41 by adjusting the size of warning image 41. In addition, since image projection system 1 can adjust the size of warning image 41, the size of warning image 41 held in content memory 31 or the like can be reduced in advance, and the amount of data for storing warning image 41 can be reduced. Therefore, image projection system 1 can effectively utilize the limited memory space of content memory 31 and the like.

Second Exemplary Embodiment

In the first exemplary embodiment, the projection of the content image to the position of face region 2A of person 2 is exemplified. The second exemplary embodiment exemplifies that the content image is projected to a position different from the position of face region 2A of person 2. In the present exemplary embodiment, matters different from the first exemplary embodiment will be mainly described, and description of the same matters as the first exemplary embodiment will be omitted or simplified.

Figure 10:
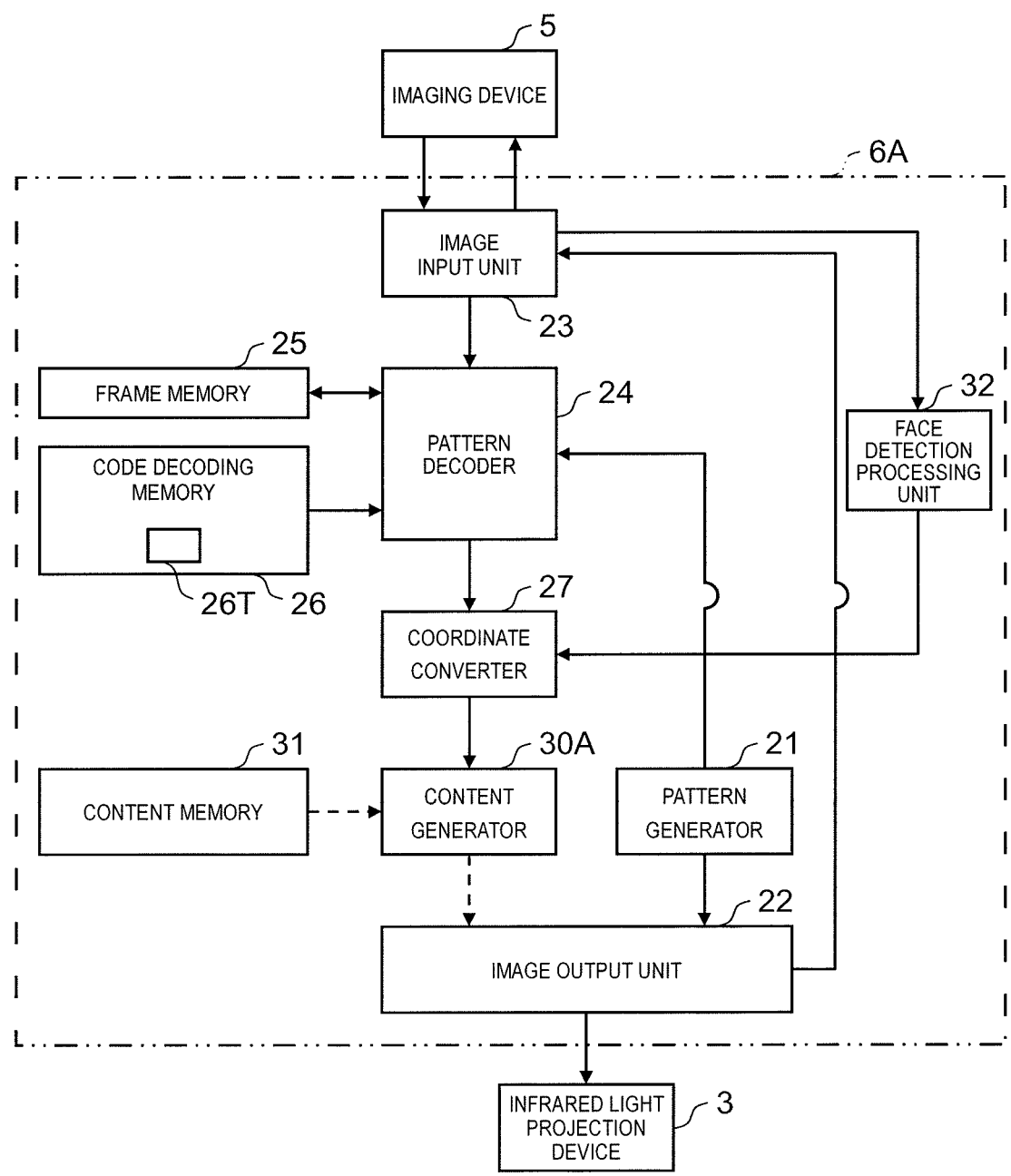
FIG. 10 is a block diagram illustrating a functional configuration example of a computing device in a second exemplary embodiment.

FIG. 10 is a block diagram illustrating an example of a functional configuration of computing device 6A. Computing device 6A includes content generator 30A instead of content generator 30 as compared with computing device 6 of the first exemplary embodiment.

Content generator 30A generates a content image to be mapped, avoiding face region 2A of person 2 based on the calibration information. The content images for projection are sequentially output toward image output unit 22. The content image includes, for example, a decorative image for decorating the scene in which person 2 is placed.

Content generator 30A generates information on the size (content size) on which the content image is projected. The content size may be equal to face region 2A, larger than face region 2A, or smaller than face region 2A. Content generator 30A may automatically generate the content size according to the positional information of each feature region so as to fit in the region where face region 2A and person 2 are absent. The content size may be input by the user via the operator of computing device 6.

Content generator 30A receives information on the projector coordinates of face region 2A from coordinate converter 27. Content generator 30A generates projection positional information of the content image based on the projector coordinates of face region 2A. For example, content generator 30A generates the projection positional information so that the projector coordinates of face region 2A and the coordinates of the content image do not have an overlapping portion.

Figure 11:
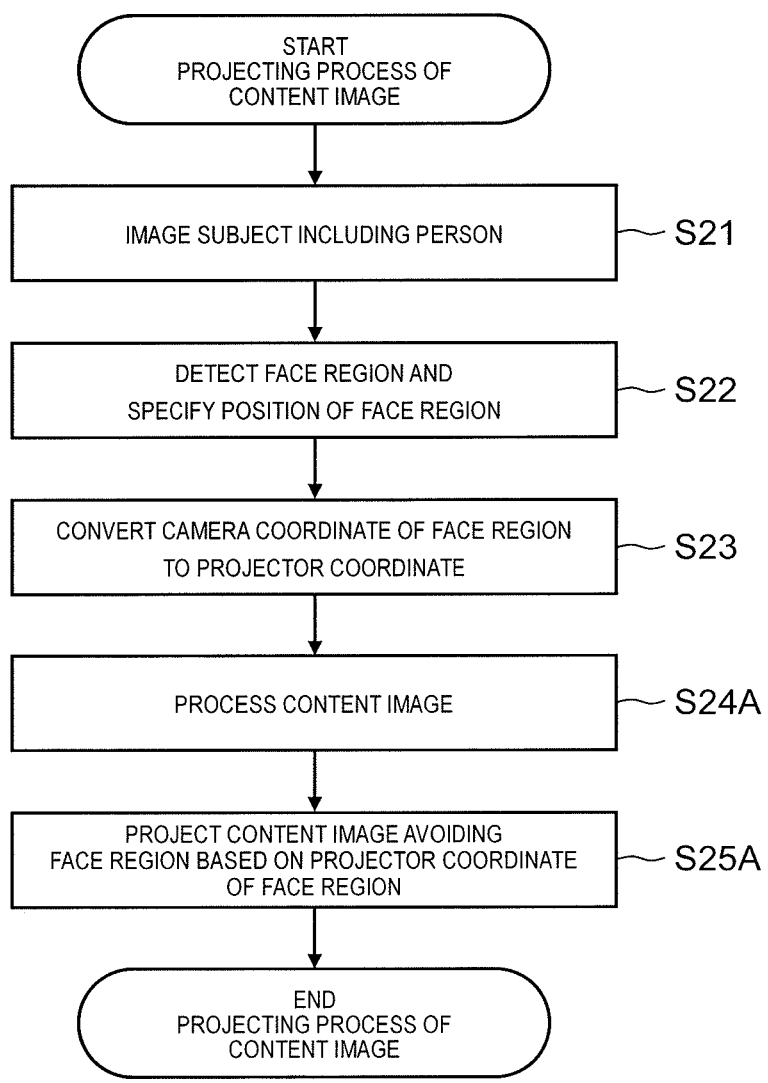
FIG. 11 is a flowchart illustrating an example of a projection process of a content image (decorative image) in consideration of a face region of a person.

FIG. 11 is a flowchart showing an example of projection processing of a content image (decorative image) considering face region 2A of person 2. The projection process of the content image in consideration of face region 2A of person 2 is performed after the calibration process shown in FIG. 5 described above. In FIG. 11, the same processes as those in FIG. 6 is applied with the same process numbers, and the explanation thereof will be omitted or simplified.

Content generator 30A acquires a content image (decorative image) from content memory 31, and processes the content image based on face region 2A (S24A). For example, content generator 30A adjusts the size of the content image so that the content image does not overlap with face region 2A. Content generator 30A may process the content shape. Content generator 30A generates projection positional information on the content image related to a projection position at which the content image does not overlap with face region 2A based on the projector coordinates of face region 2A. Content generator 30A sends the generated (for example, processed) content image and the projection positional information on the content image to image output unit 22. Image output unit 22 sends the content image from content generator 30A and the projection positional information on the content image to infrared light projection device 3. The size information and the shape information on the content may be sent to infrared light projection device 3.

Infrared light projection device 3 acquires the content image from computing device 6 and the projection positional information on the content image. Infrared light projection device 3 projects the content image (decorative image) with the determined content size and content shape at the projection position based on the projection positional information of the content image (S25A).

According to the projection process of the decorative image in consideration of face region 2A of person 2 shown in FIG. 11, image projection system 1 projects the decorative image using the projector coordinate position while avoiding the camera coordinate position of face region 2A. Therefore, face region 2A is not covered with the decorative image. Therefore, even if imaging device 5 images imaging area CA including face region 2A of person 2, the face and the decorative image of person 2 are imaged without face region 2A being covered with the decorative image. Therefore, the user who confirms this captured image can confirm the decorative image which does not exist in real space with the face of person 2.

Therefore, image projection system 1 can color various events (for example, ceremonial occasions, effects in an amusement park) occurring in person 2. In addition, image projection system 1 can put the appearance and the expression of person 2 in the captured image without covering face region 2A of person 2 in the decorated various events. Therefore, when looking back at the event in the future, the checker who confirms the captured image can easily recall the situation at the time of the event and the situation of person 2.

Next, a use case of image projection system 1 of the present exemplary embodiment will be described. As use cases, for example, use cases 4 and 5 shown below can be considered.

Figure 12:
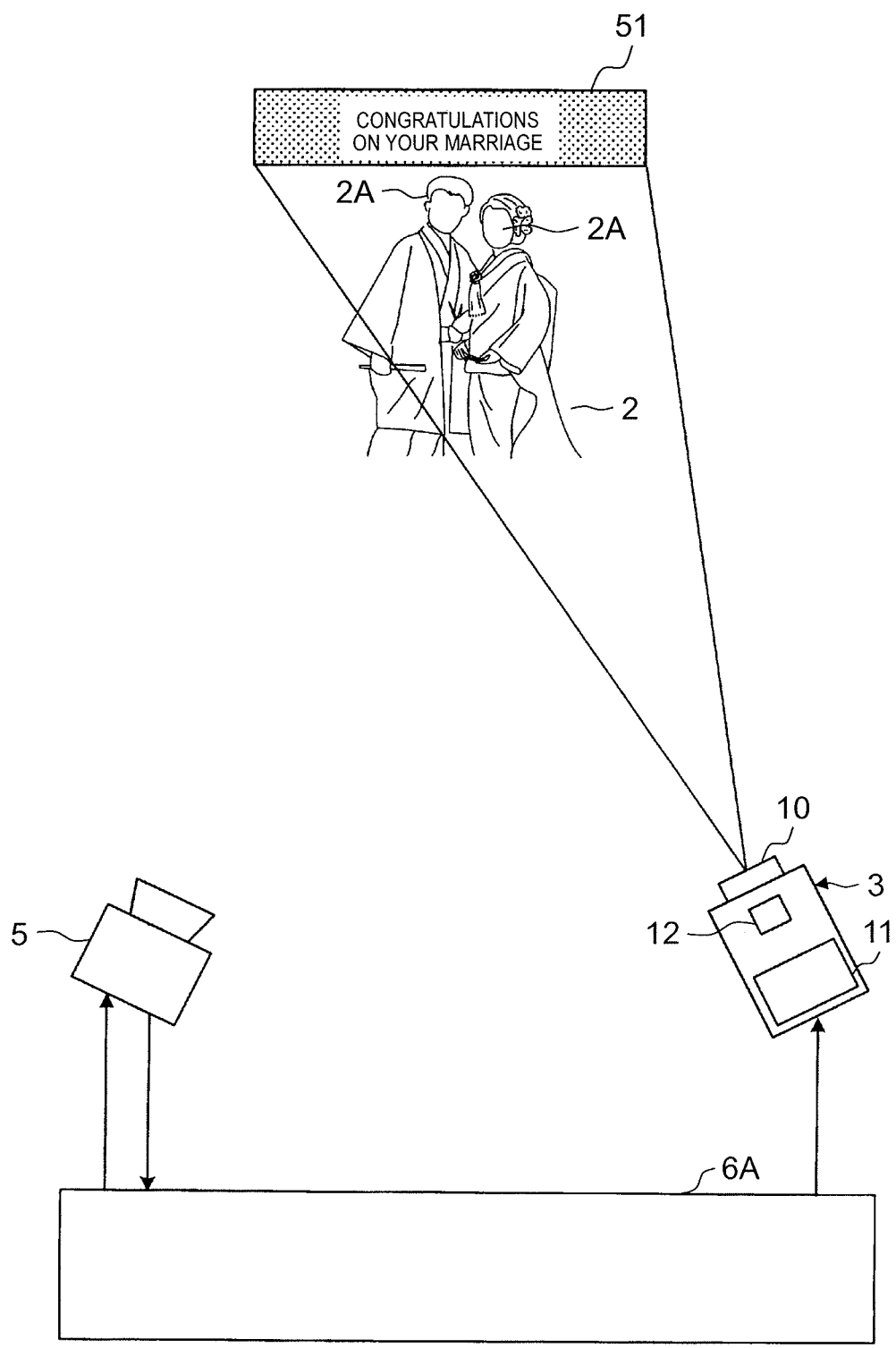
FIG. 12 is a schematic view illustrating a use case 4.

FIG. 12 is a schematic diagram for illustrating use case 4. Infrared light projection device 3 projects decorative image 51 as an infrared image around face region 2A without overlapping with face region 2A of person 2. FIG. 12 illustrates an example in which decorative image 51 including information (here, congratulatory messages and shapes for the groom and bride) including desired characters and figures is projected as decorative image 51 on person 2 (here, the bride and groom of the wedding). Accordingly, image projection system 1 can evoke surprise and pleasure to the photographer (participants of wedding ceremony or the like) by decorative image 51 that can be viewed only when the image captured by imaging device 5 is developed (or displayed).

Figure 13:
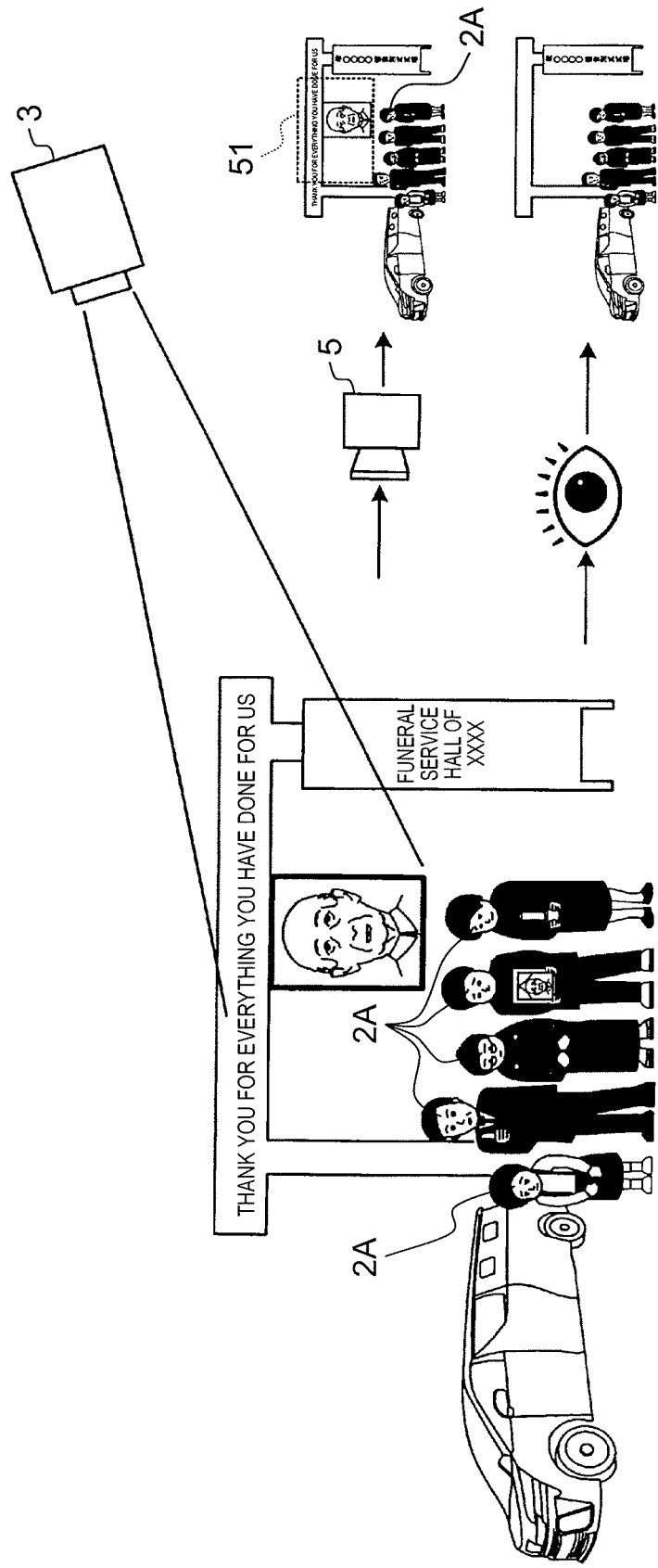
FIG. 13 is a schematic view illustrating a use case 5.

FIG. 13 is a schematic view for illustrating use case 5. FIG. 13 assumes a scene in which a gathering commemorative photograph of relatives is taken in the study hall at the funeral. For example, infrared light projection device 3 capable of emitting infrared light with high light intensity emits information on the image of a deceased person or the comment of an individual or a bereaved as decorative image 51. Decorative image 51 is radiated to a position not overlapping with each face region 2A of the bereaved. In this case, although decorative image 51 cannot be visually recognized in the real space, when the camera provided in a smartphone images an image, decorative image 51 can be visually recognized in the captured image.

In addition, content generator 30A may calculate the projection position of decorative image 51 based on the position of face region 2A, and project decorative image 51 to the calculated projection position. The information on the comment in decorative image 51 may be a comment of thanks such as "thank you for everything you have done for us" or a desired comment heard to the deceased before life.

According to image projection system 1 of use case 5, since decorative image 51 cannot be visually recognized with the naked eye, it is possible to progress an actual funeral event smoothly. In addition, when a captured image is confirmed in the future and a funeral event is recalled, it is possible to strongly cherish the bereaved relative to the deceased person. In addition, by using image projection system 1, the funeral event can be colored by decorative image 51. Image projection system 1 enables the study site to provide a captured image including decorative image 51 as added value of the funeral event, and can increase the evaluation of the study site.

Figure 14:
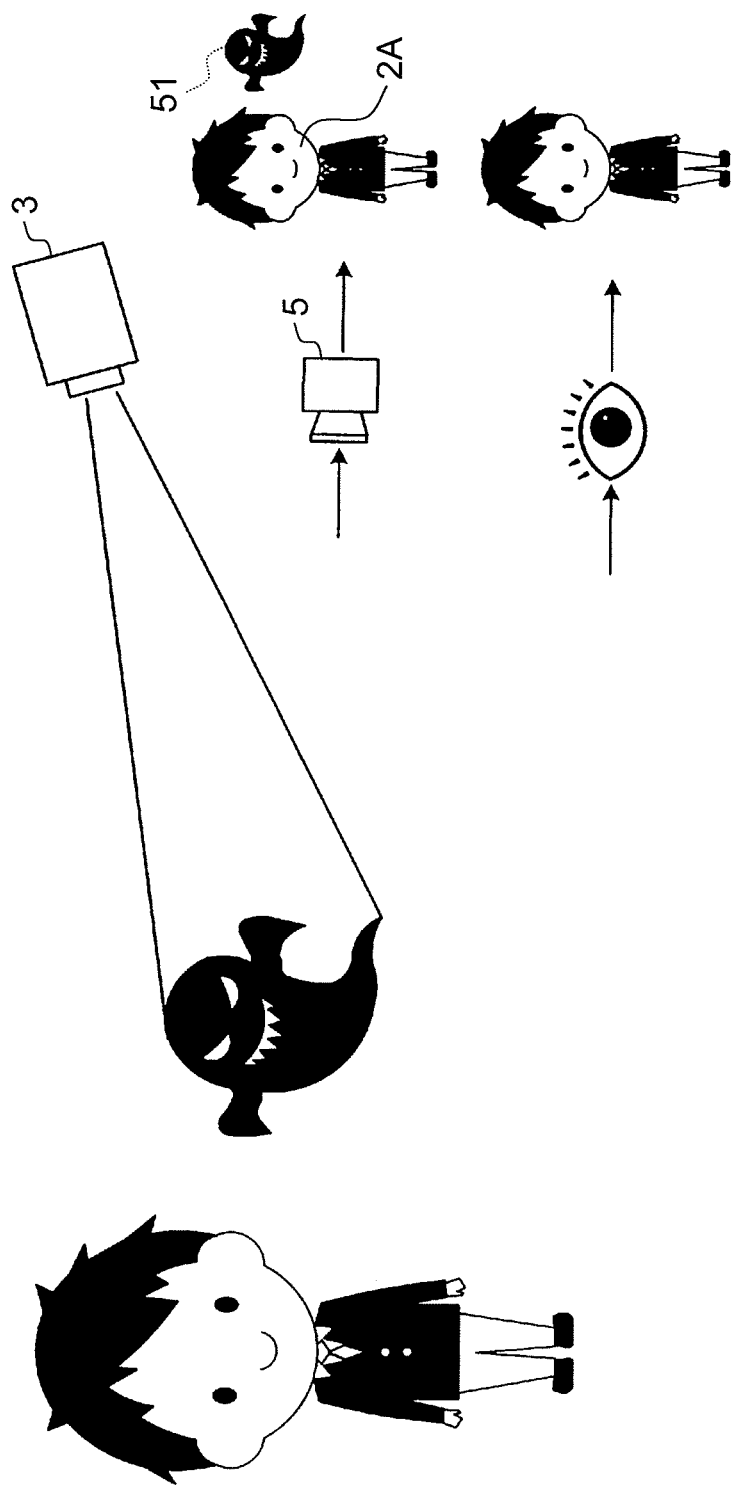
FIG. 14 is a schematic view illustrating a use case 6.

FIG. 14 is a schematic view for illustrating use case 6. FIG. 14 assumes that image projection system 1 is used in a haunted house in a theme park. For example, infrared light projection device 3 capable of emitting infrared light with high light intensity projects a psychic-related image (for example, a ghost image) as decorative image 51. In this case, although decorative image 51 cannot be visually recognized in the real space, when the camera provided in a smartphone images an image, decorative image 51 can be visually recognized in the captured image. Therefore, the camera can image a psychic photograph including decorative image 51.

In addition, content generator 30A may calculate the projection position of decorative image 51 based on the position of face region 2A, and project decorative image 51 to the calculated projection position.

According to image projection system 1 of use case 6, when person 2 who visited the haunted house confirms the image captured by the camera to confirm the ghost that did not exist in the real space in the haunted house. Person 2 can feel more frightened. Therefore, image projection system 1 can provide a thrilling amusement system.

Image projection system 1 can increase the types of projectable ghosts by holding decorative images 51 related to a large number of ghost characters in content memory 31. In addition, content generator 30A may process decorative image 51 to decorate a ghost character. In addition, image projection system 1 may provide a story hint to the guest of the theme park by decorative image 51 being included in the captured image.

As described above, image projection system 1 according to the present exemplary embodiment includes infrared light projection device 3 that projects an image using infrared light, imaging device 5, and computing device 6A. Computing device 6A generates conversion information for converting the camera coordinates used by imaging device 5 and the projector coordinates used by infrared light projection device 3 based on the positional relationship between the predetermined pattern image projected by infrared light projection device 3 and the predetermined pattern image captured by imaging device 5. Imaging device 5 images a subject including person 2. Computing device 6A detects a first position indicating a position related to camera coordinates of a specific region of person 2. Computing device 6A converts the information on the first position into information on a second position indicating the position related to the projector coordinates of the specific region based on the conversion information. Infrared light projection device 3 projects decorative image 51 avoiding a specific region based on the information on the second position.

Accordingly, image projection system 1 detects a specific region in person 2 and can project decorative image 51 using infrared rays, which is an example of non-visible light in consideration of a specific region (for example, face region 2A) of person 2. Therefore, while person 2 can be visually recognized as it is with the naked eye, decorative image 51 can be confirmed in a region other than the specific region in the captured image. Therefore, image projection system 1 can decorate the experience of person 2 in the captured image, the state of the person at the time of the experience, the facial expression of the face, or the like and can color the memories of person 2.

Third Exemplary Embodiment

In the first and second exemplary embodiments, computing devices 6 and 6A are provided separately. In the third exemplary embodiment, it is illustrated that infrared light projection device 3 has the functions that computing devices 6 and 6A have, without computing devices 6 and 6A being provided separately. The third exemplary embodiment mainly illustrates that the image projection system projects warning image 41 onto face region 2A as in the first exemplary embodiment. However, as in the second exemplary embodiment, decorative image 51 may be projected avoiding face region 2A.

Figure 15:
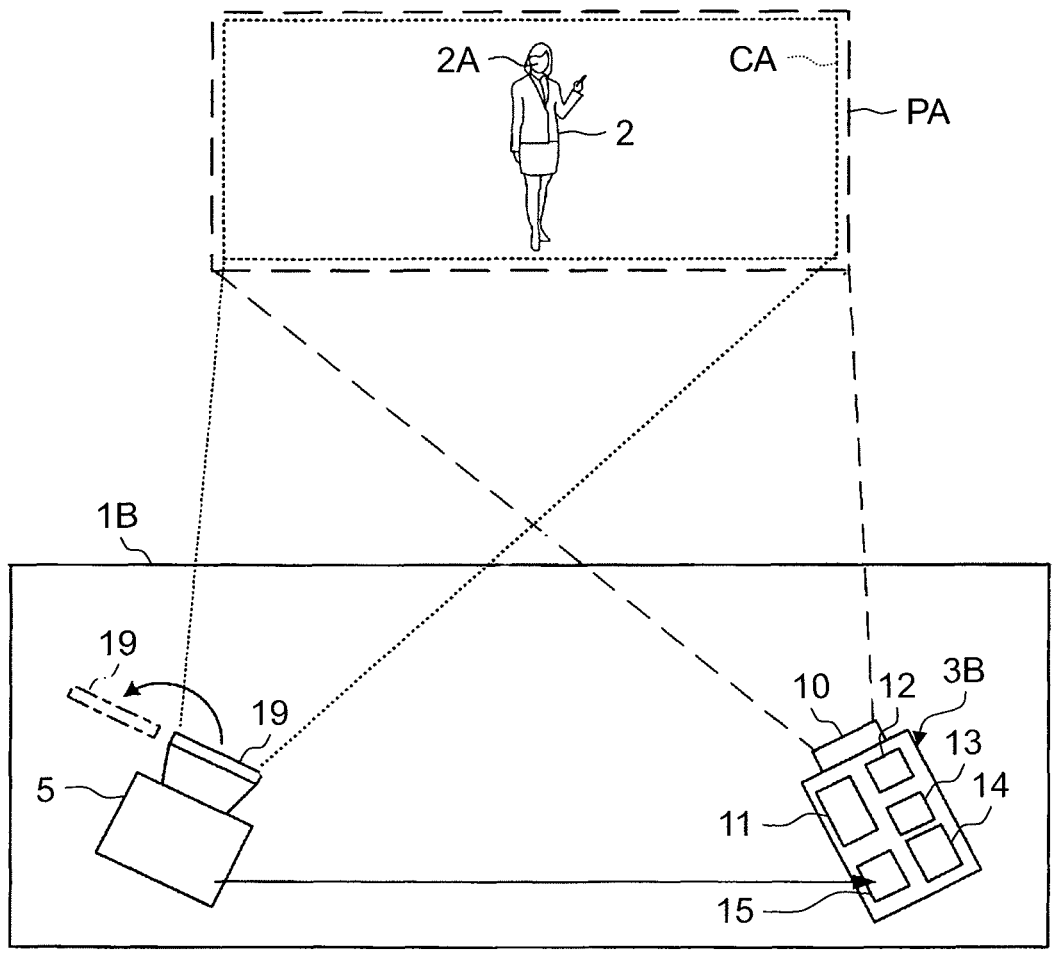
FIG. 15 is a configuration example illustrating an example of an image projection system in a third exemplary embodiment.

FIG. 15 is a schematic view showing an example of image projection system 1B. Image projection system 1B includes infrared light projection device 3B and imaging device 5. In FIG. 15, the description of the same configuration as that of image projection system 1 in the first and second exemplary embodiments illustrated in FIG. 1 will be omitted or simplified.

Infrared light projection device 3B includes emitter 10, infrared light source 11, DMD 12, controller 13, processor 14, and communication device 15. Controller 13 is formed of, for example, micro electro mechanical systems (MEMS) and controls the operation of infrared light source 11 and DMD 12. Communication device 15 is connected to imaging device 5 by wire or wirelessly. Communication device 15 wirelessly communicates with imaging device 5 using, for example, a wireless LAN or Bluetooth (registered trademark), and acquires a captured image.

Processor 14 is configured by, for example, a field programmable gate array (FPGA). Processor 14 has substantially the same function as that of computing device 6 or computing device 6B. That is, processor 14 includes pattern generator 21B, image output unit 22B, image input unit 23B, pattern decoder 24B, frame memory 25B, code decoding memory 26B, coordinate converter 27B, content generator 30B, content memory 31B, and face detection processing unit 32B.

Figure 16:
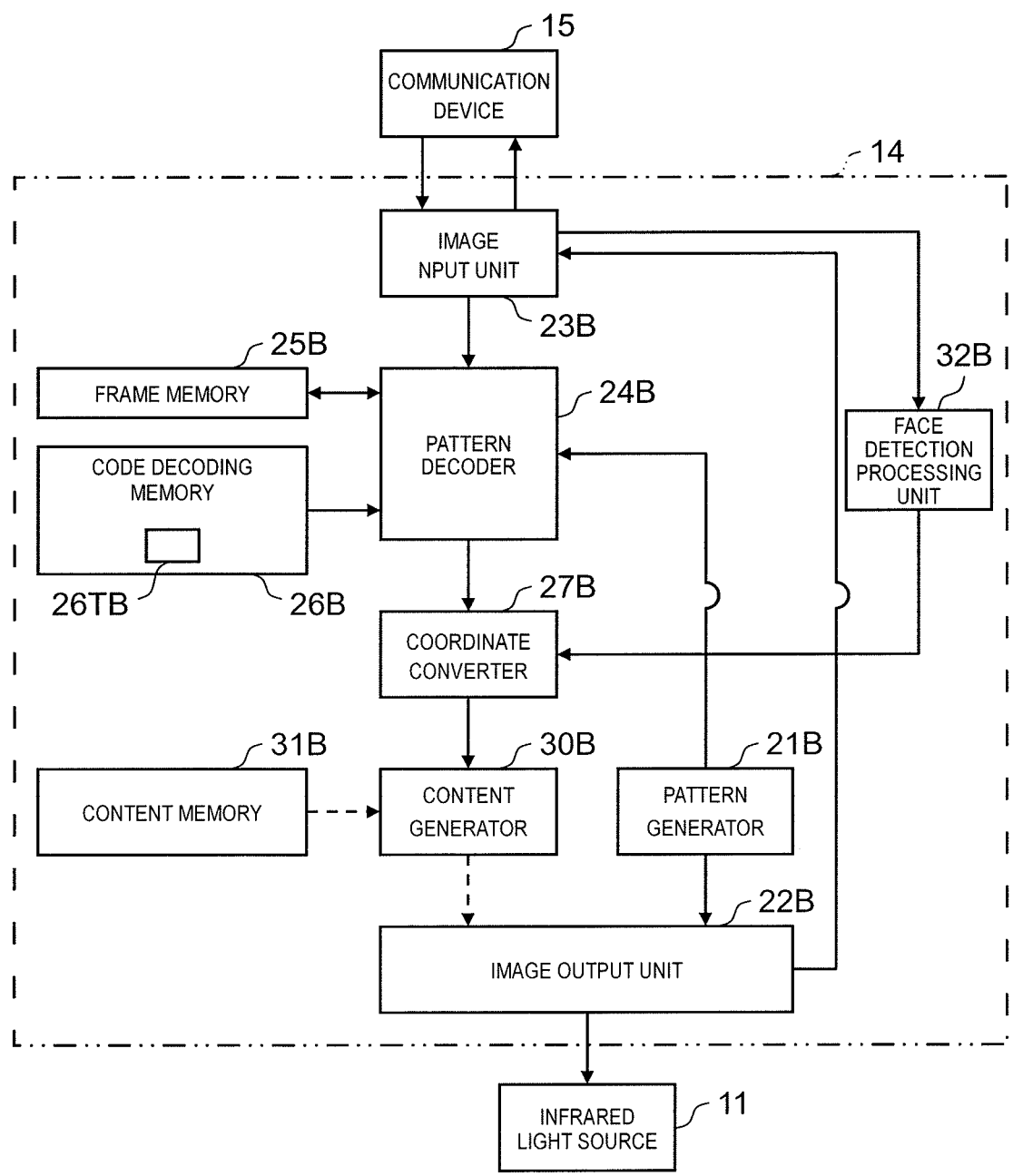
FIG. 16 is a block diagram illustrating a functional configuration example of a processor of an infrared light projection device.

FIG. 16 is a block diagram showing a configuration example of processor 14. In FIG. 16, "B" is added to the end of the reference numeral of each component in comparison with FIG. 4. However, it is added to distinguish the configuration of computing device 6 from the configuration of processor 14 and the functions are similar. Image input unit 23 of computing device 6 differs from image input unit 23B of processor 14 and transmits and receives data to and from communication device 15. Image output unit 22B of processor 14 differs from image output unit 22 of computing device 6 in that the data output destination is infrared light source 11.

As described above, infrared light projection device 3 of the present exemplary embodiment includes infrared light source 11 that projects an image using infrared light, communication device 15 for acquiring an image captured by imaging device 5, and processor 14 for generating conversion information for converting the camera coordinates used by imaging device 5 and the projector coordinates used by infrared light projection device 3 based on the positional relationship between a predetermined pattern image projected by infrared light source 11 and a predetermined pattern image captured by imaging device 5. Processor 14 detects a first position indicating a position related to camera coordinates of a specific region in person 2 included in the subject imaged by imaging device 5 and converts information on the first position into information on a second position indicating a position related to the projector coordinates in a specific region based on the conversion information. Infrared light source 11 projects warning image 41 overlapping the entire region of the specific region based on the information on the second position.

Infrared light source 11 is an example of a projector. Communication device 15 is an example of an acquisition unit. Processor 14 is an example of a processing unit.

Accordingly, infrared light projection device 3 can detect a specific region of person 2 and project warning image 41 using infrared light, which is an example of non-visible light, in consideration of the specific region of person 2. Therefore, it is not possible to confirm a specific region in the captured image while grasping a specific region of person 2 with the naked eye, and it is possible to protect the privacy of person 2, the stage on which person 2 appears, copyrights of costumes, and the like. On the other hand, it is possible to confirm regions other than the specific region of person 2. Therefore, infrared light projection device 3 can reduce the visibility by limiting it to a part of the image region in the captured image while appropriately protecting the privacy, the copyright, and the like in the captured image. Furthermore, since infrared light projection device 3 has the function of computing device 6 according to the first and second exemplary embodiments, it becomes unnecessary to provide computing device 6 separately. Therefore, the installation space of computing device 6 can be reduced, and the cost required for computing device 6 can be reduced.

Other Exemplary Embodiment

As described above, the first to third exemplary embodiments have been described as examples of the technology in the present disclosure. However, the technology in the present disclosure is not limited to this, and can also be applied to exemplary embodiments in which changes, replacements, additions, omissions, and the like have been made. In addition, the exemplary embodiments may be combined.

In the first to third exemplary embodiments, the image projection device exemplifies the projection of an image using infrared light. However, non-visible light other than infrared (for example, ultraviolet light) may be used to project an image.

In the first and third exemplary embodiments, when there are a plurality of captured images, projecting the content image is exemplified so as to overlap all of the plurality of face regions 2A. In the second and third exemplary embodiments, when there are a plurality of captured images, the projection of the content image is illustrated so as to avoid all of the plurality of face regions 2A, that is, not to overlap with all of the plurality of face regions 2A. Alternatively, infrared light projection device 3 may project the content image so as to overlap with specific face region 2A among face regions 2A of the plurality of persons 2.

That is, the subject imaged by imaging device 5 may include a plurality of persons 2. Infrared light projection device 3 may project the warning image to a second position indicating a position related to the projector coordinates of face region 2A of the specific person among the plurality of persons 2.

Accordingly, image projection system 1 can capture an image by imaging device 5 even when person 2 who does not want to capture the image by imaging device 5 and person 2 who wants to capture the image by imaging device 5 coexist. Even in this case, image projection system 1 can hide the periphery of the face region of person 2 who does not want to capture by the warning image, and can appropriately protect the privacy of person 2.

FIG. 17 is a schematic view illustrating a first projection example of warning image 41 in a case where there are a plurality of persons 2. FIG. 17 exemplifies that there are two persons 2A1 who desire to image as an example other than a specific person, and one person 2A2 who does not want to image as an example of a specific person. In FIG. 17, warning image 41 is not projected on person 2A1 who wants to capture an image, and warning image 41 is projected on person 2A2 who does not want to capture an image.

In addition, infrared light projection device 3 may project the warning image on a second position indicating a position related to the projector coordinates of face region 2A of a person other than the specific person among the plurality of persons 2.

Accordingly, image projection system 1 can image an image by imaging device 5 even when, for example, person 2 who is a performer of the theater and person 2 who is the audience are mixed. Even in this case, image projection system 1 can protect privacy by hiding face region 2A of the spectator with the warning image while improving the advertising effect without hiding face region 2A of the performer of the theater in the captured image.

FIG. 18 is a schematic view illustrating a second projection example of warning image 41 in a case where there are a plurality of persons 2. FIG. 18 exemplifies that there are two performers 2A3 in the theater as an example of a specific person, and there is one audience 2A4 as an example other than the specific person. In FIG. 18, warning image 41 is not projected on performer 2A3 and the face can be confirmed, and warning image 41 is projected on audience 2A4 and the face cannot be confirmed.

In the first to third exemplary embodiments, face region 2A is mainly exemplified as the specific region of person 2. However, it may be other than face region 2A. For example, there may be a copyright or the like in an accessory, a costume or the like worn by person 2. Therefore, warning image 41 may be projected so as to overlap, for example, the entire region of the part of person 2 corresponding to the part of the costume. A part such as a costume may be performed, for example, by image feature extraction in a captured image, or a user operation for specifying a region such as a costume may be received by the operator. Accordingly, image projection system 1 can appropriately protect the copyright and the like.

In the first to third exemplary embodiments, the processor, including the controller, may be physically configured in any way. In addition, since the processing content can be changed by changing the program by using a programmable processor, the degree of freedom in processor design can be increased. The processor may be configured of one semiconductor chip or may be physically configured of a plurality of semiconductor chips. When the processor is configured with a plurality of semiconductor chips, each control of the first to third exemplary embodiments may be realized by different semiconductor chips. In this case, it can be considered that one processor is configured by the plurality of semiconductor chips. In addition, the processor may be configured by a member (such as a capacitor) having a function different from that of the semiconductor chip. In addition, one semiconductor chip may be configured to realize the function of the processor and the other functions. In addition, a plurality of processors may be configured by one processor.

INDUSTRIAL APPLICABILITY

The present disclosure is useful for an image projection system, an image projection device, an image projection method, and the like that can reduce visibility by limiting to a partial image region in a captured image.

REFERENCE MARKS IN THE DRAWINGS 1, 1B IMAGE PROJECTION SYSTEM
2 PERSON
2A FACE REGION
3, 3B INFRARED LIGHT PROJECTION DEVICE
5 IMAGING DEVICE
6, 6A COMPUTING DEVICE
10 EMITTER
11 INFRARED LIGHT SOURCE
12 DMD
13 CONTROLLER
14 PROCESSOR
15 COMMUNICATION DEVICE
19 VISIBLE LIGHT CUT FILTER
21, 21B PATTERN GENERATOR
22, 22B IMAGE OUTPUT UNIT
23, 23B IMAGE INPUT UNIT
24, 24B PATTERN DECODER
25, 25B FRAME MEMORY
26, 26B CODE DECODING MEMORY
26T, 26TB CONVERSION TABLE
27, 27B COORDINATE CONVERTER
30, 30A, 30B CONTENT GENERATOR
31, 31B CONTENT MEMORY
40 STAGE
41 WARNING IMAGE
51 DECORATIVE IMAGE
CA IMAGING AREA
PA PROJECTION AREA

The invention claimed is:

1. An image projection system comprising:
an image projection device that projects an image using non-visible light;
an imaging device; and
a computing device,
wherein the computing device generates conversion information for converting camera coordinates used by the imaging device and projector coordinates used by the image projection device based on a positional relationship between a predetermined pattern image projected by the image projection device and the predetermined pattern image captured by the imaging device,
the imaging device images a subject including a person,
the computing device detects a first position indicating a position related to the camera coordinates in a specific region in the person,
the computing device converts information on the first position into information on a second position indicating a position related to the projector coordinates in the specific region based on the conversion information, and
the image projection device projects a warning image for overlapping with an entire region of the specific region based on the information on the second position.

2. The image projection system of claim 1,
wherein the specific region in the person is a face region of the person.

3. The image projection system of claim 2,
wherein the computing device controls a size of the warning image based on a size of the face region of the person.

4. The image projection system of claim 2 or 3,
wherein the subject imaged by the imaging device includes a plurality of persons, and
the image projection device projects the warning image to the second position related to a face region of a specific person among the plurality of persons.

5. The image projection system of claim 2 or 3,
wherein the subject imaged by the imaging device includes a plurality of persons, and
the warning image is projected to the second position related to a face region of a person other than the specific person among the plurality of persons.

6. An image projection device comprising:
a projector that projects an image using non-visible light;
an acquisition unit that acquires the image captured by an imaging device; and
a processing unit that generates conversion information for converting camera coordinates used by the imaging device and projector coordinates used by the image projection device based on a positional relationship between a predetermined pattern image projected by the projector and the predetermined pattern image captured by the imaging device,
wherein the processing unit detects a first position indicating a position related to the camera coordinates in a specific region in a person included in a subject imaged by the imaging device and converts information on the first position into information on a second position indicating a position related to the projector coordinates in the specific region based on the conversion information, and
the projector projects a warning image for overlapping with an entire region of the specific region based on the information on the second position.

7. An image projection method in an image projection system, the method comprising:
projecting a first pattern image projected by an image projection device;
causing an imaging device to image the first pattern image to acquire a second pattern image;
generating conversion information for converting camera coordinates used by the imaging device and projector coordinates used by the image projection device based on a positional relationship between the first pattern image and the second pattern image;
imaging a subject including a person by the imaging device;
detecting a first position indicating a position related to the camera coordinates in a specific region in the person;
converting information on the first position into information on a second position indicating a position related to the projector coordinates in the specific region based on the conversion information; and causing the image projection device to project a warning image for overlapping with an entire region of the specific region based on the information on the second position.

* * * * *